US012615217B2

(12) United States Patent
Wang et al.

(10) Patent No.: US 12,615,217 B2
(45) Date of Patent: Apr. 28, 2026

(54) DEVICES, METHODS AND COMPUTER READABLE MEDIA FOR SCHEDULING OPTIMIZATION FOR TELECOMMUNICATION SYSTEMS

(71) Applicant: Nokia Technologies Oy, Espoo (FI)

(72) Inventors: Yonggang Wang, Shanghai (CN); Hua Chao, Shanghai (CN); Zexian Li, Espoo (FI); Guillermo Pocovi, Aalborg (DK); Ping-Heng Kuo, London (GB)

(73) Assignee: Nokia Technologies Oy, Espoo (FI)

( * ) Notice: Subject to any disclaimer, the term of this patent is extended or adjusted under 35 U.S.C. 154(b) by 10 days.

(21) Appl. No.: 18/720,058

(22) PCT Filed: Dec. 17, 2021

(86) PCT No.: PCT/CN2021/139000
§ 371 (c)(1),
(2) Date: Jun. 14, 2024

(87) PCT Pub. No.: WO2023/108585
PCT Pub. Date: Jun. 22, 2023

(65) Prior Publication Data
US 2025/0055807 A1 Feb. 13, 2025

(51) Int. Cl.
*H04L 47/56* (2022.01)

(52) U.S. Cl.
CPC .................................. *H04L 47/56* (2013.01)

(58) Field of Classification Search
CPC ..... H04L 47/22; H04L 47/2441; H04L 47/20; H04L 47/32; H04L 49/3027; H04L 49/90;
(Continued)

(56) References Cited

U.S. PATENT DOCUMENTS 10,812,402 B2 * 10/2020 Southworth .......... H04L 43/106
2013/0343188 A1 * 12/2013 Detwiler .............. H04L 47/621
370/230.1
(Continued)

FOREIGN PATENT DOCUMENTS

EP 3 893 450 A1 10/2021
WO WO 2019/243078 A1 12/2019
(Continued)

OTHER PUBLICATIONS

PCT/CN2021/139000, ISR, May 30, 2022, 4 pg.
PCT/CN2021/139000, WR OPN, May 30, 2022, 3 pg.
CATT, "Further details on QoS information from CN and UE", R2-1903148 3GPP TSG-RAN WG2 Meeting #105bis, Xi'an China Apr. 8-12, 2019, 6 pgs.
(Continued)

*Primary Examiner* — Djenane M Bayard
(74) *Attorney, Agent, or Firm* — Lippes Mathias LLP

(57) ABSTRACT

Disclosed are methods and apparatus for scheduling optimization. A terminal device in a communication network may comprise at least one processor and at least one memory having computer program code stored thereon and configured, with the at least one processor, cause the terminal device to perform: receiving, from a network device, a first data packet; and receiving, from the network device, at least one subsequent data packet according to at least one time delay, wherein the at least one time delay is calculated for the at least one subsequent data packet based on parameters associated with a type of traffic shaper.

15 Claims, 10 Drawing Sheets

(58) Field of Classification Search

CPC ......... H04L 47/12; H04L 45/38; H04L 47/11; H04L 43/10; H04L 43/0876; H04L 45/02; H04L 47/24; H04L 47/323; H04L 47/801; H04L 45/24; H04L 45/28; H04L 47/2483; H04L 47/34; H04L 47/6255; H04L 47/805; H04L 67/1097; H04L 47/30; H04L 47/39; H04L 47/629; H04L 47/762; H04L 47/781; H04L 49/30; H04L 49/3009; H04L 49/3018; H04L 1/0083; H04L 45/021; H04L 45/028; H04L 45/122; H04L 45/123; H04L 45/125; H04L 45/16; H04L 45/20; H04L 45/22; H04L 45/42; H04L 45/46; H04L 45/566; H04L 45/70; H04L 45/745; H04L 45/7453; H04L 47/122; H04L 47/18; H04L 47/2466; H04L 47/52; H04L 47/621; H04L 47/6235; H04L 47/10; H04L 43/0852; H04L 43/0829; H04L 67/02; H04L 43/16; H04L 65/1069; H04L 47/125; H04L 69/40; H04L 69/22; H04L 65/80; H04L 43/087; H04L 47/283

See application file for complete search history.

(56) References Cited

U.S. PATENT DOCUMENTS

| | | | | |
|---|---|---|---|---|
| 2017/0041209 A1* | 2/2017 | Joshi | ....................... | H04L 43/20 |
| 2019/0182075 A1* | 6/2019 | Chen | ....................... | H04L 47/13 |
| 2020/0213022 A1 | 7/2020 | Götz et al. | | |
| 2020/0259896 A1 | 8/2020 | Sachs et al. | | |
| 2021/0014177 A1 | 1/2021 | Kasichainula | | |
| 2024/0056385 A1* | 2/2024 | Bataineh | ................. | H04L 47/76 |

FOREIGN PATENT DOCUMENTS

| | | | |
|---|---|---|---|
| WO | WO 2020/088745 A1 | 5/2020 | |
| WO | WO 2020/165857 A1 | 8/2020 | |

OTHER PUBLICATIONS

Zhao, "Latency Analysis of Multiple Classes of AVB Traffic in TSN with Standard Credit Behavior Using Network Calculus", IEEE Trans. On Indust. V. 63, N. 10, Abstract.

Hasan, "Improved End to End Delay in CBS Using Data Compression for Time Sensitive Network", 2021 2nd Information Communication Technologies Conference (ICTC), Abstract.

* cited by examiner

100

UE 110 gNB 120

Figure 5:
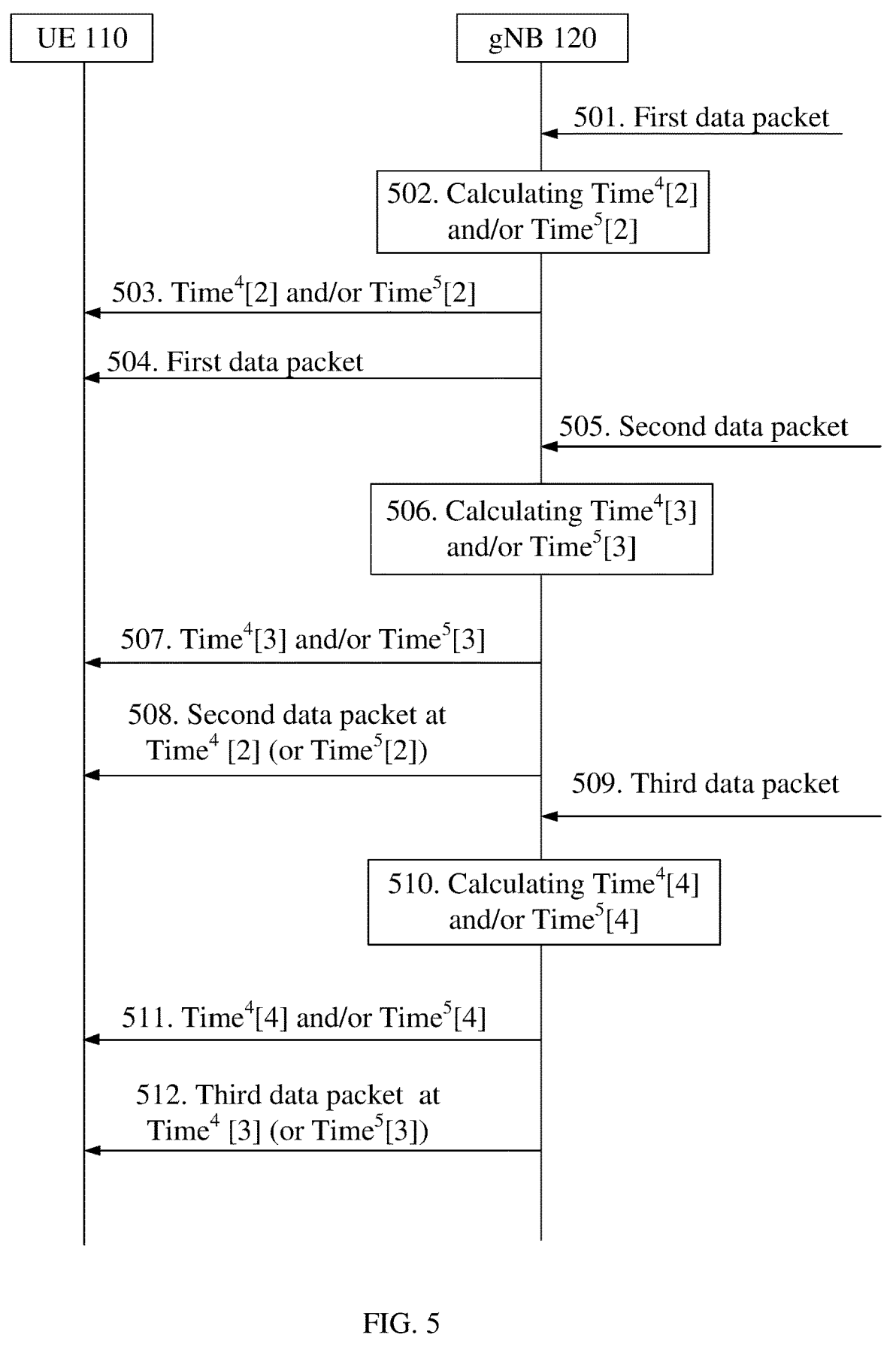

501. First data packet

502. Calculating $Time^4[2]$ and/or $Time^5[2]$

503. $Time^4[2]$ and/or $Time^5[2]$

504. First data packet

505. Second data packet

506. Calculating $Time^4[3]$ and/or $Time^5[3]$

507. $Time^4[3]$ and/or $Time^5[3]$

508. Second data packet at $Time^4[2]$ (or $Time^5[2]$)

509. Third data packet

510. Calculating $Time^4[4]$ and/or $Time^5[4]$

511. $Time^4[4]$ and/or $Time^5[4]$

512. Third data packet at $Time^4[3]$ (or $Time^5[3]$)

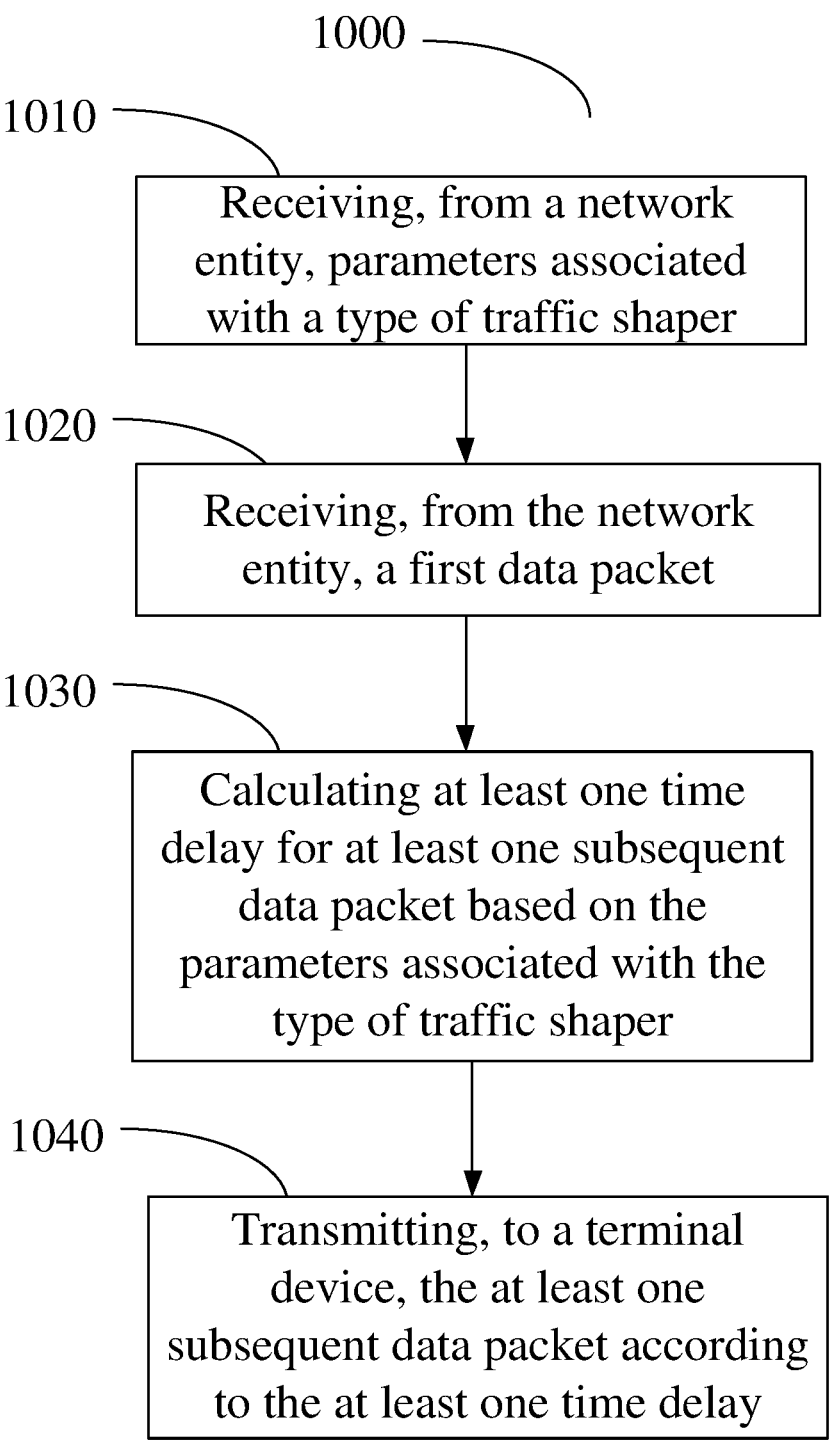

1000

1010 Receiving, from a network entity, parameters associated with a type of traffic shaper 1020 Receiving, from the network entity, a first data packet 1030 Calculating at least one time delay for at least one subsequent data packet based on the parameters associated with the type of traffic shaper 1040 Transmitting, to a terminal device, the at least one subsequent data packet according to the at least one time delay

DEVICES, METHODS AND COMPUTER READABLE MEDIA FOR SCHEDULING OPTIMIZATION FOR TELECOMMUNICATION SYSTEMS

TECHNICAL FIELD

Various example embodiments described herein generally relate to communication technologies, and more particularly, to devices, methods, and computer readable media for scheduling optimization.

BACKGROUND

Mechanisms for time-sensitive transmission of data over Ethernet networks have been defined for Time Sensitive Networking (TSN) in Institute of Electrical and Electronics Engineers (IEEE) standards such as IEEE 802.1Q-2018. For the Third Generation partnership Project (3GPP) Release 16 (Rel-16) and/or Release 17 (Rel-17), the feasibility and industrial control use case of centralized TSN have been studied. It is agreed to extend the fifth generation (5G) system (5GS) by integrating the 5GS with TSN networks to enable time sensitive communication (TSC). Credit-based shaper (CBS), as specified in IEEE 802.1Q-2018, is a promising traffic shaper for the egress port, and CBS is mandatory for TSN fully distributed model. In the fully distributed model, there is no centralized network controller, so the network has no information of the exact packet arrival time in 5GS. Therefore, when CBS is configured, it brings challenges for the RAN to schedule or perform resource reservation as what are specified in Rel-16 and/or Rel-17.

SUMMARY

A brief summary of exemplary embodiments is provided below to provide basic understanding of some aspects of various embodiments. It should be noted that this summary is not intended to identify key features of essential elements or define scopes of the embodiments, and its sole purpose is to introduce some concepts in a simplified form as a preamble for a more detailed description provided below.

In a first aspect, an example embodiment of a terminal device in a communication network is provided. The terminal device may comprise at least one processor and at least one memory. At least one memory includes computer program code stored thereon. At least one memory and the computer program code may be configured to, with at least one processor, cause the terminal device to receive, from a network device, a first data packet. The terminal deice may further receive, from the network device, at least one subsequent data packet according to at least one time delay. The at least one time delay is calculated for the at least one subsequent data packet based on parameters associated with a type of traffic shaper.

In some example embodiments, the type of traffic shaper is credit-based shaper (CBS), and the parameters associated with CBS further comprise: MaxFrameSize, operIdleSlope, and/or portTransmitRate.

In some example embodiments, the at least one delay is calculated in a case where the network device determines that one of the parameters associated with CBS classMeasurementInterval is larger than a threshold.

In some example embodiments, the at least one time delay comprises: a first type of time delay calculated for the $i^{th}$ data packet by using a first equation: $Delay^1 = Time^1[i] - Time[i-1] = MaxFrameSize/operIdleSlope + delayOffset$, and receiving, from a network device, at least one subsequent data packet according to at least one time delay further comprises: receiving, from the network device, the $i^{th}$ data packet at $Time^1[i]$ described by the first equation: $Time^1[i] = Time[i-1] + Delay^1$, i being an integer larger than 1, $Time^1[i]$ being the transmission time of the $i^{th}$ data packet and $Time[i-1]$ being the actual transmission time for the $(i-1)^{th}$ data packet.

In some example embodiments, the at least one time delay comprises: a second type of time delay calculated for the $i^{th}$ data packet by using a second equation: $Delay^2 = Time^2[i] - Time^2[i-1] = MaxFrameSize/operIdleSlope$; and/or a third type of time delay calculated for the $i^{th}$ data packetb by using a third equation: $Delay^3 = Time^3[i] - Time^3[i-1] = MaxFrameSize/operIdleSlope + delayOffset$, and receiving, from a network device, at least one subsequent data packet according to at least one time delay further comprises: receiving, from the network device, the $i^{th}$ data packet at $Time^2[i]$ described by the second equation: $Time^2[i] = Time[i-1] + Delay^2$ or at $Time^3[i]$ described by the third equation: $Time^3[i] = Time[i-1] + Delay^3$, wherein i may be an integer larger than 1, $Time^2[i]$ or $Time^3[i]$ may be candidate transmission time for the $i^{th}$ data packet, and $Time[i-1]$ is the actual transmission time for the $(i-1)^{th}$ data packet.

In some example embodiments, the at least one time delay comprises: a fourth type of time delay calculated for the ith data packet by using a fourth equation: $Delay^4[i] = Time^4[i] - Time[i-1] = Size[i-1]/operIdleSlope$; and/or a fifth type of time delay calculated for the ith data packetb by using a fifth equation: $Delay^5[i] = Time^5[i] - Time[i-1] = Size[i-1]/operIdleSlope + delayOffset$, and receiving, from a network device, at least one subsequent data packet according to at least one time delay further comprises: receiving, from the network device, the $i^{th}$ data packet at $Time^4[i]$ described by the fourth equation: $Time^4[i] = Time[i-1] + Delay^4$ or at $Time^5[i]$ described by the fifth equation: $Time^5[i] = Time[i-1] + Delay^5$, wherein i may be an integer larger than 1, $Time^4[i]$ or $Time^5[i]$ may be candidate transmission time for the $i^{th}$ data packet, $Time[i-1]$ is the actual transmission time for the $(i-1)^{th}$ data packet, and $Size[i-1]$ is the actual size of the $(i-1)^{th}$ data packet.

In some example embodiments, $delayOffset = (maximum(EthernetFrameSize))/portTransmitRate$; and EthernetFrameSize is the number of bits per frame in Ethernet.

In some example embodiments, the at least one memory and the computer program code are further configured to, with the at least one processor, cause the terminal device to perform: receiving, from the network device, the parameters associated with CBS and at least one equation for calculating the at least one time delay for the at least one subsequent data packet; and synchronizing with the network device for receiving the at least one subsequent data packet, wherein the terminal device calculates the at least one time delay for the at least one subsequent data packet based on the parameters associated with CBS using the at least one time delay equation.

In some example embodiments, the at least one memory and the computer program code are further configured to, with the at least one processor, cause the terminal device to perform: receiving, from the network device, $Delay^1$ calculated by the network device before receiving the second data packet from the network device.

In some example embodiments, the at least one memory and the computer program code are further configured to, with the at least one processor, cause the terminal device to perform: receiving, from the network device, $Delay^2$ and/or Delay$^3$ calculated by the network before receiving the second data packet from the network device.

In some example embodiments, the at least one memory and the computer program code are further configured to, with the at least one processor, cause the network device to perform: receiving, from the network device, Time$^4$[i] and/or Time$^5$[i] calculated by the network device before receiving the i$^{th}$ data packet from the network device.

In some example embodiments, Delay$^1$, Delay$^2$ or Delay$^3$ is received through the scheduling signaling or MAC control element (MAC CE) or RRC signaling.

In some example embodiments, the at least one memory and the computer program code are further configured to, with the at least one processor, cause the network device to perform: before receiving, from the network device, a subsequent data packet according to the at least one time delay, monitoring a physical downlink control channel (PDCCH) scheduling the reception of said subsequent data packet.

In a second aspect, an example embodiment of a network device in a communication network is provided. The network device may comprise at least one processor and at least one memory.

At least one memory includes computer program code stored thereon. At least one memory and the computer program code may be configured to, with at least one processor, cause the network device to perform: receiving, from a the network entity, parameters associated with a type of traffic shaper; receiving, from the network entity, a first data packet; calculating at least one time delay for at least one subsequent data packet based on the parameters associated with the type of traffic shaper; and transmitting, to a terminal device, the at least one subsequent data packet according to the at least one time delay.

In some example embodiments, the type of traffic shaper is credit-based shaper (CBS), and the parameters associated with CBS further comprise: MaxFrameSize, operIdleSlope, and/or portTransmitRate.

In some example embodiments, the at least one delay is calculated in a case where the network device determines that one of the parameters associated with CBS classMeasurementInterval is larger than a threshold.

In some example embodiments, calculating at least one time delay for at least one subsequent data packet based on parameters associated with CBS further comprises: calculating a first type of time delay for the i$^{th}$ data packet by using a first equation: Delay$^1$=Time$^1$[i]−Time[i−1]=MaxFrameSize/operIdleSlope+delayOffset; and transmitting, to a terminal device, the at least one subsequent data packet according to the at least one time delay further comprises: transmitting, to the terminal device, the i$^{th}$ data packet at Time$^1$[i] described by the first equation: Time$^1$[i]=Time[i−1]+Delay$^1$, i being an integer larger than 1, Time$^1$[i] being transmission time of the i$^{th}$ data packet and Time[i−1] being the actual transmission time for the (i−1)$^{th}$ data packet.

In some example embodiments, calculating at least one time delay for at least one subsequent data packet based on parameters associated with CBS further comprises: calculating a second type of time delay for the ith data packet by using a second equation: Delay$^2$=Time$^2$[i]−Time[i−1]=MaxFrameSize/operIdleSlope; and/or calculating a third type of time delay for the i$^{th}$ data packet by using a third equation: Delay$^3$=Time$^3$[i]−Time[i−1]=MaxFrameSize/operIdleSlope+delayOffset; and transmitting, to a terminal device, the at least one subsequent data packet according to the at least one time delay further comprises: transmitting, to the terminal device, the i$^{th}$ data packet at Time$^2$[i] described by the second equation: Time$^2$[i]=Time[i−1]+Delay$^2$ or at Time$^3$[i] described by the third equation: Time$^3$[i]=Time[i−1]+Delay$^3$, wherein i may be an integer larger than 1, Time$^2$[i] or Time$^3$[i] may be candidate transmission time for the i$^{th}$ data packet, and Time[i−1] is the actual transmission time for the (i−1)$^{th}$ data packet.

In some example embodiments, calculating at least one time delay for at least one subsequent data packet based on parameters associated with CBS further comprises: calculating a fourth type of time delay for the i$^{th}$ data packet by using a fourth equation: Delay$^4$[i]=Time$^4$[i]−Time[i−1]=Size[i−1]/operIdleSlope; and/or calculating a fifth type of time delay for the i$^{th}$ data packet by using a fifth equation: Delay$^5$[i]=Time$^5$[i]−Time[i−1]=Size[i−1]/operIdleSlope+delayOffset; and transmitting, to a terminal device, the at least one subsequent data packet according to the at least one time delay further comprises: transmitting, to the terminal device, the i$^{th}$ data packet at Time$^4$[i] described by the fourth equation: Time$^4$[i]=Time[i−1]+Delay$^4$ or at Time$^5$[i] described by the fifth equation: Time$^5$[i]=Time[i−1]+Delay$^5$, wherein i may be an integer larger than 1, Time$^4$[i] or Time$^5$[i] may be candidate transmission time for the i$^{th}$ data packet, Time[i−1] is the actual transmission time for the (i−1)$^{th}$ data packet, and Size[i−1] is the actual size of the (i−1)$^{th}$ data packet.

In some example embodiments, delayOffset=(maximum (EthernetFrameSize))/portTransmitRate; and EthernetFrameSize is the number of bits per frame in Ethernet.

In some embodiments, the at least one memory and the computer program code are further configured to, with the at least one processor, cause the network device to perform: transmitting, to the terminal device, the parameters associated with CBS and at least one equation for calculating the at least one time delay for the at least one subsequent data packet; and synchronizing with the terminal device for transmission of the at least one subsequent data packet, wherein the terminal device calculates the at least one time delay for the at least one subsequent data packet based on the parameters associated with CBS using the at least one time delay equation.

In some example embodiments, wherein the at least one memory and the computer program code are further configured to, with the at least one processor, cause the network device to perform: transmitting, to the terminal device, Delay$^1$ calculated by the network device before transmitting the second data packet to the terminal device.

In some example embodiments, wherein the at least one memory and the computer program code are further configured to, with the at least one processor, cause the network device to perform: transmitting, to the terminal device, Delay$^2$ and/or Delay$^3$ calculated by the network before transmitting the second data packet to the terminal device.

In some example embodiments, wherein the at least one memory and the computer program code are further configured to, with the at least one processor, cause the network device to perform: transmitting, to the terminal device, Time$^4$[i] and/or Time$^5$[i] calculated by the network device before transmitting the i$^{th}$ data packet to the terminal device.

In some example embodiments, Delay$^1$, Delay$^2$ or Delay$^3$ is transmitted through the scheduling signaling or MAC CE or RRC signaling.

In a third aspect, an example embodiment of a method implemented at a terminal device in a communication network is provided. The method may comprise: receiving, from a network device, a first data packet; and receiving, from the network device, at least one subsequent data packet according to at least one time delay, wherein the at least one time delay is calculated for the at least one subsequent data packet based on parameters associated with a type of traffic shaper.

In some example embodiments, the type of traffic shaper is credit-based shaper (CBS), and the parameters associated with CBS further comprise: MaxFrameSize, operIdleSlope, and/or portTransmitRate.

In some example embodiments, the at least one delay is calculated in a case where the network device determines that one of the parameters associated with CBS classMeasurementInterval is larger than a threshold.

In some example embodiments, the at least one time delay comprises: a first type of time delay calculated for the $i^{th}$ data packet by using a first equation: $Delay^1=Time^1[i]-Time[i-1]=MaxFrameSize/operIdleSlope+delayOffset$, and receiving, from a network device, at least one subsequent data packet according to at least one time delay further comprises: receiving, from the network device, the $i^{th}$ data packet at $Time^1[i]$ described by the first equation: $Time^1[i]=Time[i-1]+Delay^1$, i being an integer larger than 1, $Time^1[i]$ being the transmission time of the $i^{th}$ data packet and $Time[i-1]$ being the actual transmission time for the $(i-1)^{th}$ data packet.

In some example embodiments, the at least one time delay comprises: a second type of time delay calculated for the $i^{th}$ data packet by using a second equation: $Delay^2=Time^2[i]-Time^2[i-1]=MaxFrameSize/operIdleSlope$; and/or a third type of time delay calculated for the $i^{th}$ data packetb by using a third equation: $Delay^3=Time^3[i]-Time^3[i-1]=MaxFrameSize/operIdleSlope+delayOffset$, and receiving, from a network device, at least one subsequent data packet according to at least one time delay further comprises: receiving, from the network device, the $i^{th}$ data packet at $Time^2[i]$ described by the second equation: $Time^2[i]=Time[i-1]+Delay^2$ or at $Time^3[i]$ described by the third equation: $Time^3[i]=Time[i-1]+Delay^3$, wherein i being an integer larger than 1, $Time^2[i]$ or $Time^3[i]$ may be candidate transmission time for the $i^{th}$ data packet, and $Time[i-1]$ is the actual transmission time for the $(i-1)^{th}$ data packet.

In some example embodiments, the at least one time delay comprises: a fourth type of time delay calculated for the ith data packet by using a fourth equation: $Delay^4[i]=Time^4[i]-Time[i-1]=Size[i-1]/operIdleSlope$; and/or a fifth type of time delay calculated for the ith data packetb by using a fifth equation: $Delay^5[i]=Time^5[i]-Time[i-1]=Size[i-]/operIdleSlope+delayOffset$, and receiving, from a network device, at least one subsequent data packet according to at least one time delay further comprises: receiving, from the network device, the $i^{th}$ data packet at $Time^4[i]$ described by the fourth equation: $Time^4[i]=Time[i-1]+Delay^4$ or at $Time^5[i]$ described by the fifth equation: $Time^5[i]=Time[i-1]+Delay^5$, wherein i may be an integer larger than 1, $Time^4[i]$ or $Time^5[i]$ may be candidate transmission time for the ith data packet, $Time[i-1]$ is the actual transmission time for the $(i-1)^{th}$ data packet, and $Size[i-1]$ is the actual size of the $(i-1)^{th}$ data packet.

In some example embodiments, $delayOffset=(maximum (EthernetFrameSize))/portTransmitRate$; and EthernetFrameSize is the number of bits per frame in Ethernet.

In some example embodiments, the method further comprises: receiving, from the network device, the parameters associated with CBS and at least one equation for calculating the at least one time delay for the at least one subsequent data packet; and synchronizing with the network device for receiving the at least one subsequent data packet, wherein the method calculates the at least one time delay for the at least one subsequent data packet based on the parameters associated with CBS using the at least one time delay equation.

In some example embodiments, the method further comprises: receiving, from the network device, $Delay^1$ calculated by the network device before receiving the second data packet from the network device.

In some example embodiments, the method further comprises: receiving, from the network device, $Delay^2$ and/or $Delay^3$ calculated by the network before receiving the second data packet from the network device.

In some example embodiments, the method further comprises: receiving, from the network device, $Time^4[i]$ and/or $Time^5[i]$ calculated by the network device before receiving the $i^{th}$ data packet from the network device.

In some example embodiments, $Delay^1$, $Delay^2$ or $Delay^3$ is received through the scheduling signaling or MAC CE or RRC signaling.

In some example embodiments, the method further comprises: before receiving, from the network device, a subsequent data packet according to the at least one time delay, monitoring a physical downlink control channel (PDCCH) scheduling the reception of said subsequent data packet.

In a fourth aspect, an example embodiment of a method implemented at a network device in a communication network is provided. The method may comprise receiving, from a network entity, parameters associated with a type of traffic shaper; receiving, from the network entity, a first data packet; calculating at least one time delay for at least one subsequent data packet based on the parameters associated with the type of traffic shaper; and transmitting, to a terminal device, the at least one subsequent data packet according to the at least one time delay.

In some example embodiments, the type of traffic shaper is credit-based shaper (CBS), and the parameters associated with CBS further comprise: MaxFrameSize, operIdleSlope, and/or portTransmitRate.

In some example embodiments, the at least one delay is calculated in a case where the network device determines that one of the parameters associated with CBS classMeasurementInterval is larger than a threshold.

In some example embodiments, calculating at least one time delay for at least one subsequent data packet based on parameters associated with CBS further comprises: calculating a first type of time delay for the $i^{th}$ data packet by using a first equation: $Delay^1=Time[i]-Time[i-1]=MaxFrameSize/operIdleSlope+delayOffset$; and transmitting, to a terminal device, the at least one subsequent data packet according to the at least one time delay further comprises: transmitting, to the terminal device, the $i^{th}$ data packet at $Time^1[i]$ described by the first equation: $Time^1[i]=Time[i-1]+Delay^1$, i being an integer larger than 1, $Time^1[i]$ being transmission time of the $i^{th}$ data packet and $Time[i-1]$ being the actual transmission time for the $(i-1)^{th}$ data packet.

In some example embodiments, calculating at least one time delay for at least one subsequent data packet based on parameters associated with CBS further comprises: calculating a second type of time delay for the $i^{th}$ data packet by using a second equation: $Delay^2=Time^2[i]-Time[i-1]=MaxFrameSize/operIdleSlope$; and/or calculating a third type of time delay for the $i^{th}$ data packet by using a third equation: $Delay^3=Time^3[i]-Time[i-1]=MaxFrameSize/operIdleSlope+delayOffset$; and transmitting, to a terminal device, the at least one subsequent data packet according to the at least one time delay further comprises: transmitting, to the terminal device, the $i^{th}$ data packet at Time$^2$[i] described by the second equation: Time$^2$[i]=Time[i−1]+Delay$^2$ or at Time$^3$[i] described by the third equation: Time$^3$[i]=Time[i−1]+Delay$^3$, wherein i may be an integer larger than 1, Time$^2$[i] or Time$^3$[i] may be candidate transmission time for the i$^{th}$ data packet, and Time[i−1] is the actual transmission time for the (i−1)$^{th}$ data packet.

In some example embodiments, calculating at least one time delay for at least one subsequent data packet based on parameters associated with CBS further comprises: calculating a fourth type of time delay for the i$^{th}$ data packet by using a fourth equation: Delay$^4$[i]=Time$^4$[i]−Time[i−1] =Size[i−1]/operIdleSlope; and/or calculating a fifth type of time delay for the i$^{th}$ data packet by using a fifth equation: Delay$^5$[i]=Time$^5$[i]−Time[i−1]=Size[i−1]/operIdleSlope+ delayOffset; and transmitting, to a terminal device, the at least one subsequent data packet according to the at least one time delay further comprises: transmitting, to the terminal device, the i$^{th}$ data packet at Time$^4$[i] described by the fourth equation: Time$^4$[i]=Time[i−1]+Delay$^4$ or at Time$^5$[i] described by the fifth equation: Time$^5$[i]=Time[i−1]+Delay$^5$, wherein i may be an integer larger than 1, Time$^4$[i] or Time$^5$[i] may be candidate transmission time for the i$^{th}$ data packet, Time[i−1] is the actual transmission time for the (i−1)$^{th}$ data packet, and Size[i−1] being the actual size of the (i−1)$^{th}$ data packet.

In some example embodiments, delayOffset=(maximum (EthernetFrameSize))/portTransmitRate; and EthernetFrameSize is the number of bits per frame in Ethernet.

In some embodiments, the method further comprises: transmitting, to the terminal device, the parameters associated with CBS and at least one equation for calculating the at least one time delay for the at least one subsequent data packet; and synchronizing with the terminal device for transmission of the at least one subsequent data packet, wherein the terminal device calculates the at least one time delay for the at least one subsequent data packet based on the parameters associated with CBS using the at least one time delay equation.

In some example embodiments, the method further comprises: transmitting, to the terminal device, Delay$^1$ calculated by the network device before transmitting the second data packet to the terminal device.

In some example embodiments, the method further comprises: transmitting, to the terminal device, Delay$^2$ and/or Delay$^3$ calculated by the network before transmitting the second data packet to the terminal device.

In some example embodiments, the method further comprises: transmitting, to the terminal device, Time$^4$[i] and/or Time$^5$[i] calculated by the network device before transmitting the i$^{th}$ data packet to the terminal device.

In some example embodiments, Delay$^1$, Delay$^2$ or Delay$^3$ is transmitted through the scheduling signaling or MAC CE or RRC signaling.

In a fifth aspect, an example embodiment of an apparatus in a communication network is provided. Apparatus may comprise means for receiving, from a network device, a first data packet; and means for receiving, from the network device, at least one subsequent data packet according to at least one time delay, wherein the at least one time delay is calculated for the at least one subsequent data packet based on parameters associated with a type of traffic shaper.

In a sixth aspect, an example embodiment of an apparatus in a communication network is provided. Apparatus may comprise means for receiving, from a network entity, parameters associated with a type of traffic shaper; means for receiving, from the network entity, a first data packet; means for calculating at least one time delay for at least one subsequent data packet based on the parameters associated with the type of traffic shaper; and means for transmitting, to a terminal device, the at least one subsequent data packet according to the at least one time delay.

In a seventh aspect, an example embodiment of a computer program is provided. The computer program may comprise instructions stored on a computer readable medium. The instructions may, when executed by at least one processor of a terminal device in a communication network, cause the terminal device to perform: receiving, from a network device, a first data packet; and receiving, from the network device, at least one subsequent data packet according to at least one time delay, wherein the at least one time delay is calculated for the at least one subsequent data packet based on parameters associated with a type of traffic shaper.

In an eighth aspect, an example embodiment of a computer program is provided. The computer program may comprise instructions stored on a computer readable medium. The instructions may, when executed by at least one processor of a network device in a communication network, cause the network device to perform: receiving, from a network entity, parameters associated with a type of traffic shaper; receiving, from the network entity, a first data packet; calculating at least one time delay for at least one subsequent data packet based on the parameters associated with the type of traffic shaper; and transmitting, to a terminal device, the at least one subsequent data packet according to the at least one time delay.

Other features and advantages of the example embodiments of the present disclosure will also be apparent from the following description of specific embodiments when read in conjunction with accompanying drawings, which illustrate, by way of example, the principles of example embodiments of the present disclosure.

BRIEF DESCRIPTION OF THE DRAWINGS

Some example embodiments will now be described, by way of non-limiting examples, with reference to accompanying drawings.

FIG. 5 shows the illustration of the RAN downlink scheduling optimization with credit-based shaper (CBS) parameters for time sensitive communication (TSC) traffic according to another example embodiment of the present disclosure.

FIG. 10 shows a flow chart illustrating an example method 1000 for scheduling optimization for telecommunication systems according to an example embodiment of the present disclosure.

Throughout the drawings, same or similar reference numbers indicate same or similar elements. A repetitive description on the same elements would be omitted.

DETAILED DESCRIPTION

Herein below, some example embodiments are described in detail with reference to accompanying drawings. The following description includes specific details for the purpose of providing a thorough understanding of various concepts. However, it will be apparent to those skilled in art that these concepts may be practiced without these specific details. In some instances, well known circuits, techniques and components are shown in block diagram form to avoid obscuring the described concepts and features.

As used herein, the term "network device" refers to any suitable entities or devices that can provide cells or coverage, through which the terminal device can access the network or receive services. The network device may be commonly referred to as a base station. The term "base station" used herein can represent a node B (NodeB or NB), an evolved node B (eNodeB or eNB), or a gNB or an ng-eNB. The base station may be embodied as a macro base station, a relay node, or a low power node such as a pico base station or a femto base station. The base station may consist of several distributed network units, such as a central unit (CU), one or more distributed units (DUs), one or more remote radio heads (RRHs) or remote radio units (RRUs). The number and functions of these distributed units depend on the selected split RAN architecture.

As used herein, the term "terminal device" or "user equipment" (UE) refers to any entities or devices that can wirelessly communicate with the network devices or with each other. Examples of the terminal device can include a mobile phone, a mobile terminal, a mobile station, a subscriber station, a portable subscriber station, an access terminal, a computer, a wearable device, an on-vehicle communication device, a machine type communication (MTC) device, an internet of things (IoT) device, an internet of everything (IoE) device, a device-to-device (D2D) communication device, a vehicle to everything (V2X) communication device, a sensor and the like. The term "terminal device" can be used interchangeably with UE, a user terminal, a mobile terminal, a mobile station, or a wireless device.

Figure 1:
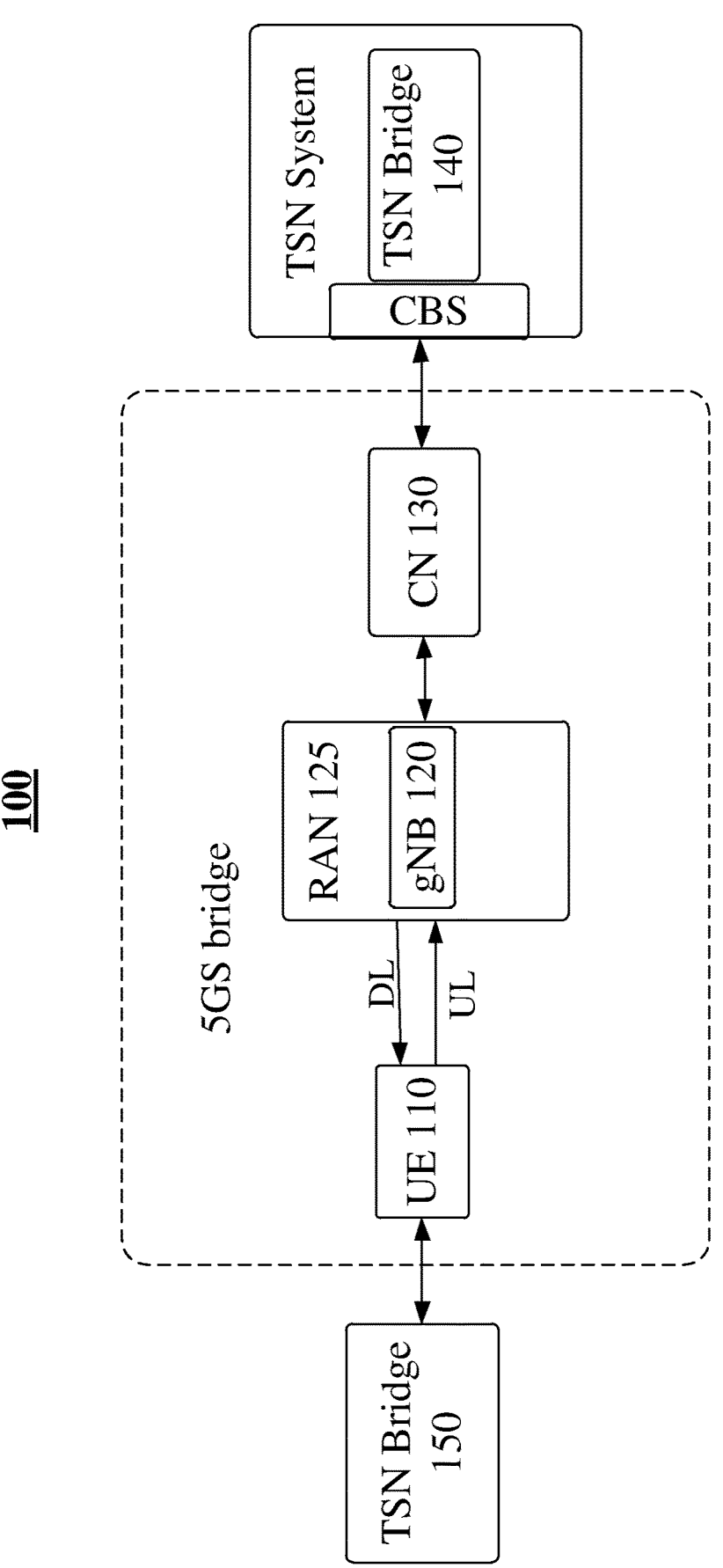
FIG. 1 illustrates a schematic diagram illustrating a communication system 100 in which example embodiments of the present application can be implemented.

FIG. 1 illustrates a schematic diagram of a communication system 100 in which example embodiments of the present disclosure can be implemented. The communication system 100 may be a 5G communication network as specified by 3GPP. It is agreed in 3GPP for the 5G communication system (5GS) as a TSN bridge to be integrated with an external network. FIG. 1 shows an example communication system 100 of integrating the 5GS with a TSN network. As shown, the 5GS acts as a logical TSN bridge. Referring to FIG. 1, the communication system 100 may include a terminal device such as user equipment (UE) 110 and the like. Moreover, the communication system 100 may also include a radio access network (RAN) 125 which may include a plurality of radio access network nodes, such as a base station or a gNB 120 configured to provide radio access in accordance with a 5G radio access technology. 5G is herein used as an example and the communication system 100 may also be configured in accordance with other radio communication standards. The radio access network (RAN) 125 may include any number of radio access network nodes. The gNB 120 may provide radio communication with the UE 110.

The UE 110 may communicate with the gNB 120 on uplink (UL) and downlink (DL) channels. The communication system 100 may further include a network entity, such as a core network (CN) 130, which is connected to the RAN 125 in a wired or wireless way. The core network 130 may comprise an access and mobility management function (AMF), a session management function (SMF), and a policy control function (PCF). The core network 130 may further comprise a user plane function (UPF) and a network-side TSN translator (NW-TT). The gNB 120 may communicate with the UPF in a wired or wireless way. The core network 130 may communicate with a TSN bridge 140 of a TSN system via the NW-TT in a wired or wireless way. The 5GS bridge may be seen as an Ethernet bridge between the TSN bridge 140 and the TSN bridge 150. UE 110 may connect with the TSN bridge 140 via device-side TSN translator (DS-TT). The UPF, DS-TT and NW-TT are not shown in FIG. 1 for simplicity. Ethernet frames may be conveyed between the UE 110 and the UPF of the core network 130. In a downlink (DL) direction, the core network 130 may forward the frames to the UE 110 via the gNB 120.

In the DL direction, the TSN bridge 140 may transmit packets to the TSN bridge 150 thought the 5GS bridge as shown in FIG. 1. The ability of the egress port of the TSN bridge 150 to transmit a large bust of packets within a short period of time may be improved by the traffic shaper. Credit-based shaper (CBS) as specified in IEEE 802.1Q-2018, is a promising traffic shaper and is mandatory for TSN fully distributed model. Because there is no centralized network controller in fully distributed model, network has no information of the exact packet arrival time in 5GS. When CBS is configured, it brings challenges for the RAN 125 to schedule or perform resource reservation. CBS in egress will increase the average delay, and the delay can be up to 250 µs per hop. Since the 5GS ingress port may receive burst of packets from the previous hop in an asynchronized way, burst arrival time parameter in the Centralized Network Configuration (CNC) Assistant Information (TSCAI) may be hard to derive especially when the source has no capability of supporting time-aware transmission. The 5GS only has the worst-case information of the traffic (i.e., MaxFramePerInterval and MaxFrameSize), resource reservation relying on the worst case may introduce inefficiency.

Figure 2:
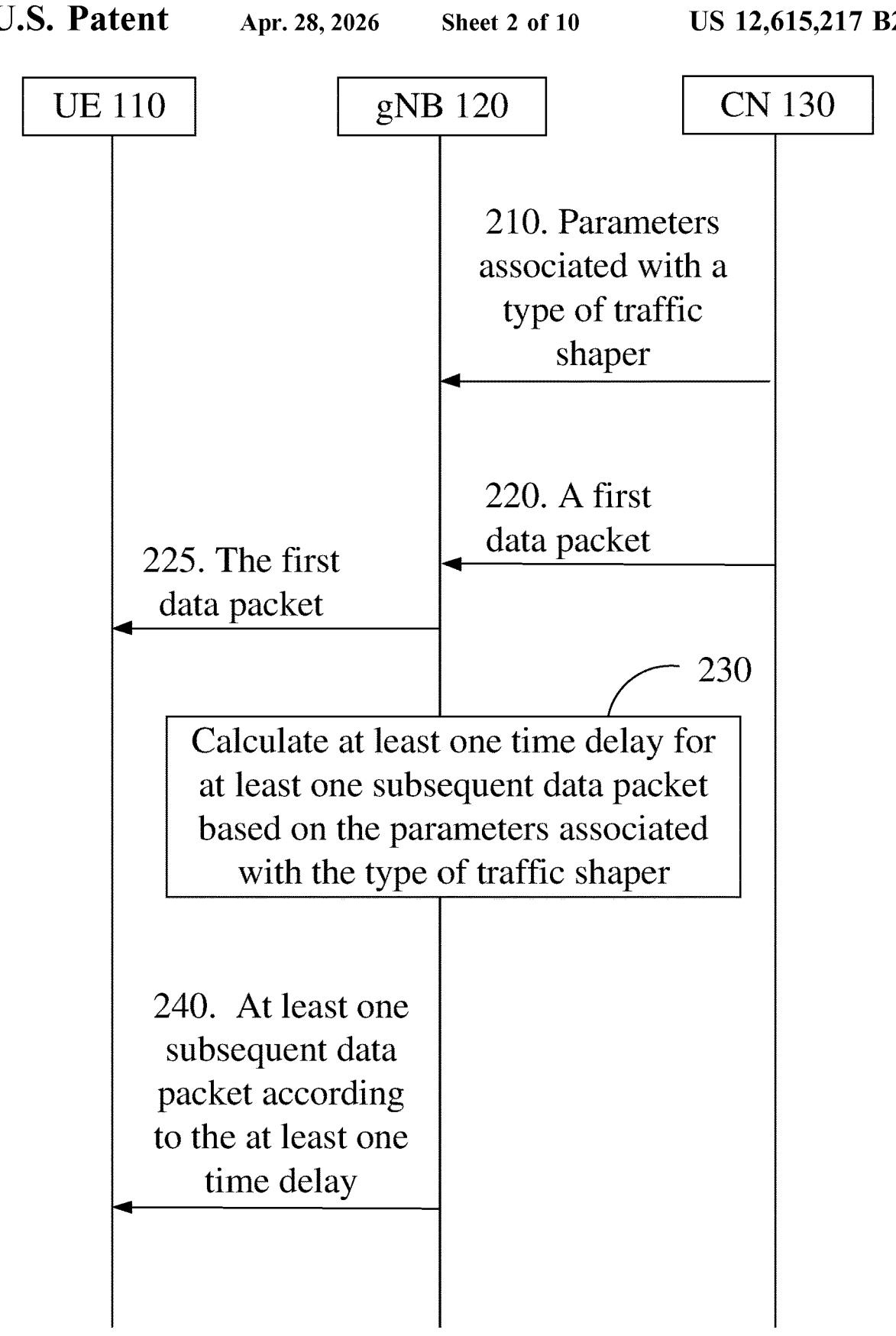
FIG. 2 shows an exemplary sequence diagram for scheduling optimization for telecommunication systems according to an example embodiment of the present disclosure.

FIG. 2 shows an exemplary sequence diagram for scheduling optimization for telecommunication systems according to an example embodiment of the present disclosure. When a type of traffic shaper is configured, a network entity, such as a 5GS core network 130, may obtain parameters associated with the type of traffic shaper, based on which the gNB 120 may perform scheduling or resources reservation in RAN 125. Referring to the FIG. 2, for TSN traffic in a DL direction, the gNB 120 may receive data packets from the core network 130, and the UE 110 may receive data packets from the gNB 120. The UE 110 is associated with a cell that the gNB 120 covers.

In an operation 210, the gNB 120 may receive, from a network entity, such as a core network (CN) 130, parameters associated with a type of traffic shaper. In one example embodiment, the type of traffic shaper may be credit-based shaper (CBS), and the parameters associated with credit-based shaper (CBS) may comprise MaxFrameSize, operIdleSlope, and/or portTransmitRate. Specifically, MaxFrameSize is a CBS parameter that describes the maximum number of bits per frame; operIdleSlope is a CBS parameter that describes the rate of change of credit, in bits per second, when the value of credit is increasing; and portTransmitRate is a CBS parameter that describes the transmission rate, in bits per second, that the underlying medium access control (MAC) service that supports transmission through the port provides.

In one example embodiment, the parameters associated with credit-based shaper (CBS) may further comprise classMeasurementInterval that describes the interval of time, in seconds, over which the TSpec is measured for traffic class N at the Talker. TSpec describes traffic specification for each TSN stream, in terms of MaxFramePerInterval and MaxFrameSize. MaxFramePerInterval is the maximum number of frames per interval.

In an operation 220, the gNB 120 may receive, from the network entity, such as the core network (CN) 130, a first data packet. The first data packet may be the first one in a burst for downlink (DL) TSN traffic. Then the gNB 120 may transmit the first data packet to the UE 110 in an operation 225. On the other hand, the UE 110 may receive, from the network device 110, the first data packet in the operation 225.

In an operation 230, the gNB 120 may calculate at least one time delay for at least one subsequent data packet based on the parameters associated with the type of traffic shaper. In one embodiment the gNB 120 may calculate at least one time delay before transmitting the first data packet to UE 110 in the operation 225. In another embodiment, the gNB 120 may calculate at least one time delay after transmitting the first data packet to UE 110 in the operation 225. The subsequent data packets may be the data packets following the first data packet in the same burst for downlink (DL) TSN traffic. In one example embodiment, the at least one time delay may be calculated in a case where the network device determines that one of the parameters associated with CBS classMeasurementInterval is larger than a threshold.

Specifically, for example, after receiving the parameters associated with credit-based shaper (CBS) from the core network 130 in the operation 210 and the first data packet from the core network 130 in the operation 220, the gNB 120, as described above, may further determine whether one of the parameters associated with CBS classMeasurementInterval is larger than a threshold in the operation 230. Furthermore, in a case where the gNB 120 determines that one of the parameters associated with CBS classMeasurementInterval is larger than a threshold, the gNB 120 may calculate at least one time delay for at least one subsequent data packet based on the parameters associated with CBS received from the core network 130. The threshold may be determined by the tolerable delay of the traffic. In one example embodiment, if the tolerable delay of the traffic is 10 ms, then the threshold may be set to 10 ms.

The gNB 120 may apply the semi-static or configured scheduling resource allocation method for one traffic based on the time sensitive communications assistant information (TSCAI) of the incoming traffic. In one example embodiment according to the present disclosure, the gNB 120 may further consider the parameter classMeasurementInterval of the incoming traffic. Since jitter of the frame arrival may impact the performance and cause resource waste and delay increase, some frames may miss the scheduled time for transmission. For some traffic class, the interval is so large that the traffic cannot tolerate the transmission delay due to the extra interval. Therefore, dynamic scheduling is a good choice when the arrival time is variable. But dynamic scheduling requires UE 110 to constantly monitor the PDCCH. It may increase UE 110's power consumption. If UE 110 is able to know the occasion when the subsequent frame is scheduled in advance, UE 110 only needs to monitor the PDCCH at this occasion. Before this, UE can do PDCCH skipping. Thus, the DL scheduling for the TSN traffic may be optimized. The gNB 120 may be able to optimize the scheduling for downlink TSC traffic based on the parameters associated with CBS received from the CN 130 and predict the packet arrival time by calculating the at least one time delay for at least one subsequent data packet in the operation 230.

Finally, in an operation 240, the gNB 120 may transmit, to the UE 110, the at least one subsequent data packet according to the at least one time delay. On the other hand, the UE 110 may receive, from the network device 110, the at least one subsequent data packet according to the at least one time delay. In one example embodiment, before receiving, from the gNB 120, a subsequent data packet according to the at least one time delay, the UE 110 may monitor a physical downlink control channel (PDCCH) scheduling the reception of the subsequent data packet.

Specifically, in one example embodiment, in the operation 230, the gNB 120 may calculate a first type of time delay for the $i^{th}$ data packet by using a first equation: $Delay^1=Time[i]-Time[i-1]=MaxFrameSize/operIdleSlope+delayOffset$. Then in the operation 240, the gNB 120 may transmit, to the UE 110, the ith data packet at $Time^1[i]$ described by the first equation: $Time^1[i]=Time[i-1]+Delay^1$, wherein i may be an integer larger than 1, $Time^1[i]$ may be the transmission time of the $i^{th}$ data packet and $Time[i-1]$ is the actual transmission time for the $(i-1)^{th}$ data packet. In one example embodiment, delayOffset may be determined by the following equation: $delayOffset=(maximum\ (EthernetFrameSize))/portTransmitRate$, and EthernetFrameSize is the number of bits per frame in Ethernet.

Specifically, in one example embodiment, before the gNB 120 transmits the second data packet to the UE 110 in the operation 240, the gNB 120 may transmit to the UE 110 $Delay^1$ calculated by the gNB 120 in the operation 230. On the other hand, the UE 110 may receive from the gNB 120, $Delay^1$ calculated by the gNB 120. In one example embodiment, the gNB 120 may transmit $Delay^1$ to the UE 110 through the scheduling signaling or MAC control element (MAC CE) or radio resource control (RRC) signaling. On the other hand, the UE 110 may receive $Delay^1$ from the gNB 120 through the scheduling signaling or MAC control element (MAC CE) or radio resource control (RRC) signaling.

Figure 3:
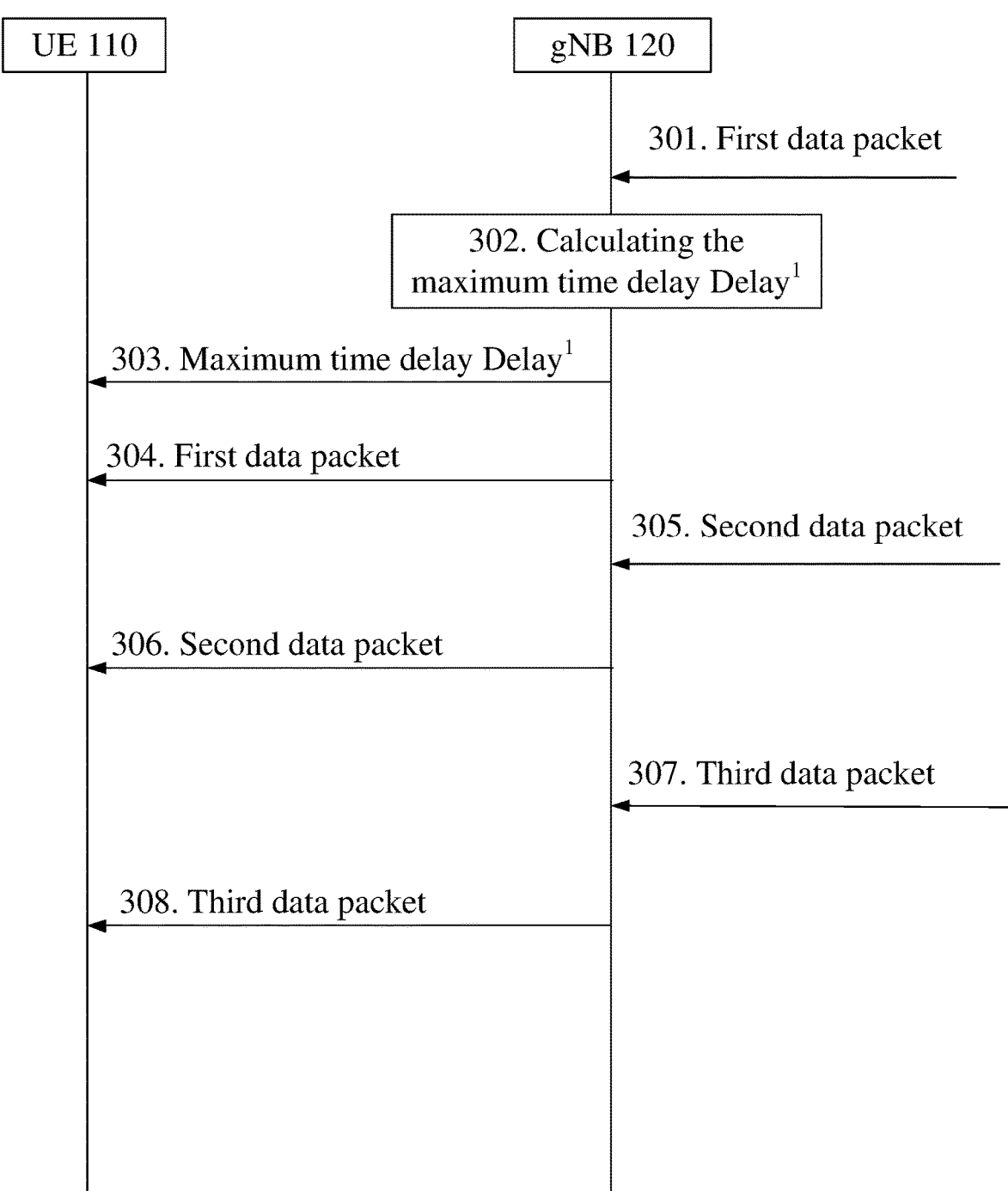
FIG. 3 shows the illustration of the RAN downlink scheduling optimization with credit-based shaper (CBS) parameters for time sensitive communication (TSC) traffic according to an example embodiment of the present disclosure.

FIG. 3 shows the illustration of the RAN downlink scheduling optimization with credit-based shaper (CBS) parameters for time sensitive communication (TSC) traffic according to an example embodiment of the present disclosure. Optionally, the gNB 120 may also transmit to the UE 110 Delay$^1$ calculated by the gNB 120 in the operation 230 before the gNB 120 transmits the first data packet to the UE110. For example, as shown in FIG. 3, at step 301, the gNB 120 may receive a first data packet from a network entity which may be the core network 130. At step 302, the gNB 120 may calculate the maximum delay Delay$^1$ of each packet based on the parameters associated with a type of traffic shaper. Then at step 303, the gNB may transmit the maximum delay Delay$^1$ for the subsequent data packets in the burst to UE 110. At step 304, the gNB may transmit the first data packet to the UE 110. After receiving the second data packet at step 305, the gNB 120 may transmit the second data packet to UE 110 according to Delay$^1$ relative to the transmission time of the first data packet. Similarly, after receiving the third data packet at step 307, the gNB 120 may transmit the third data packet to UE 110 according to Delay$^1$ relative to the transmission time of the second data packet. Specifically, in the example embodiment shown in FIG. 3, gNB 120 may transmit the downlink grant of all following packets at one time in the PDCCH scheduling the first downlink packet at step 303. Because gNB 120 does not know the load of previous CBS, so the predicted arrival time of the following packets may contain the maximum possible delay, such as the Delay$^1$ described by the first equation:

$$Delay^1 = MaxFrameSize/operIdleSlope + delayOffset \qquad (1)$$

In this way, UE 110 may directly decode the physical downlink shared channel (PDSCH) without monitoring the PDCCH. It achieves the best performance in terms of UE power consumption since UE 110 can do PDCCH skipping after receiving the first packet. However, there may be potential large latency in the case of no packet of other traffic class confliction. Moreover, in case UE 110 misses the first PDCCH, it may not be able to decode all the following packets. However, this may be solved by the hybrid automatic repeat request (HARQ) retransmission and/or increased reliability for the first PDCCH.

In another example embodiment, in the operation 230, the gNB 120 may calculate a second type of time delay for the i$^{th}$ data packet by using a second equation:

$$Delay^2 = Time^2[i] - Time[i-1] = MaxFrameSize/operIdleSlope \qquad (2)$$

and/or a third type of time delay for the i$^{th}$ data packet by using a third equation:

$$Delay^3 = Time^3[i] \qquad (3)$$
$$Time[i-1] = MaxFrameSize/operIdleSlope + delayOffset$$

And then in the operation 240, the gNB 120 may transmit, to the UE 110, the i$^{th}$ data packet at Time$^2$[i] described by the second equation: Time$^2$[i]=Time[i−1]+Delay$^2$, or the gNB 120 may transmit, to the UE 110, the i$^{th}$ data packet at Time$^3$[i] described by the third equation: Time$^3$[i]=Time[i−1]+Delay$^3$. i may be an integer larger than 1, Time$^2$[i] or Time$^3$[i] may be candidate transmission time for the i$^{th}$ data packet, and Time[i−1] is the actual transmission time for the (i−1)$^{th}$ data packet.

Specifically, in one example embodiment, before the gNB 120 transmits the second data packet to the UE 110 in the operation 240, the gNB 120 may transmit to the UE 110 Delay$^2$ and/or Delay$^3$ calculated by the gNB 120 in the operation 230. On the other hand, the UE 110 may receive from the gNB 120, Delay$^2$ and/or Delay$^3$ calculated by the gNB 120 before the gNB 120 transmits the second data packet to the UE 110. In one example embodiment, the gNB 120 may transmit Delay$^2$ or Delay$^3$ to the UE 110 through the scheduling signaling or MAC CE or radio resource control (RRC) signaling. On the other hand, the UE 110 may receive Delay$^2$ or Delay$^3$ from the gNB 120 through the scheduling signaling or MAC CE or radio resource control (RRC) signaling.

Figure 4:
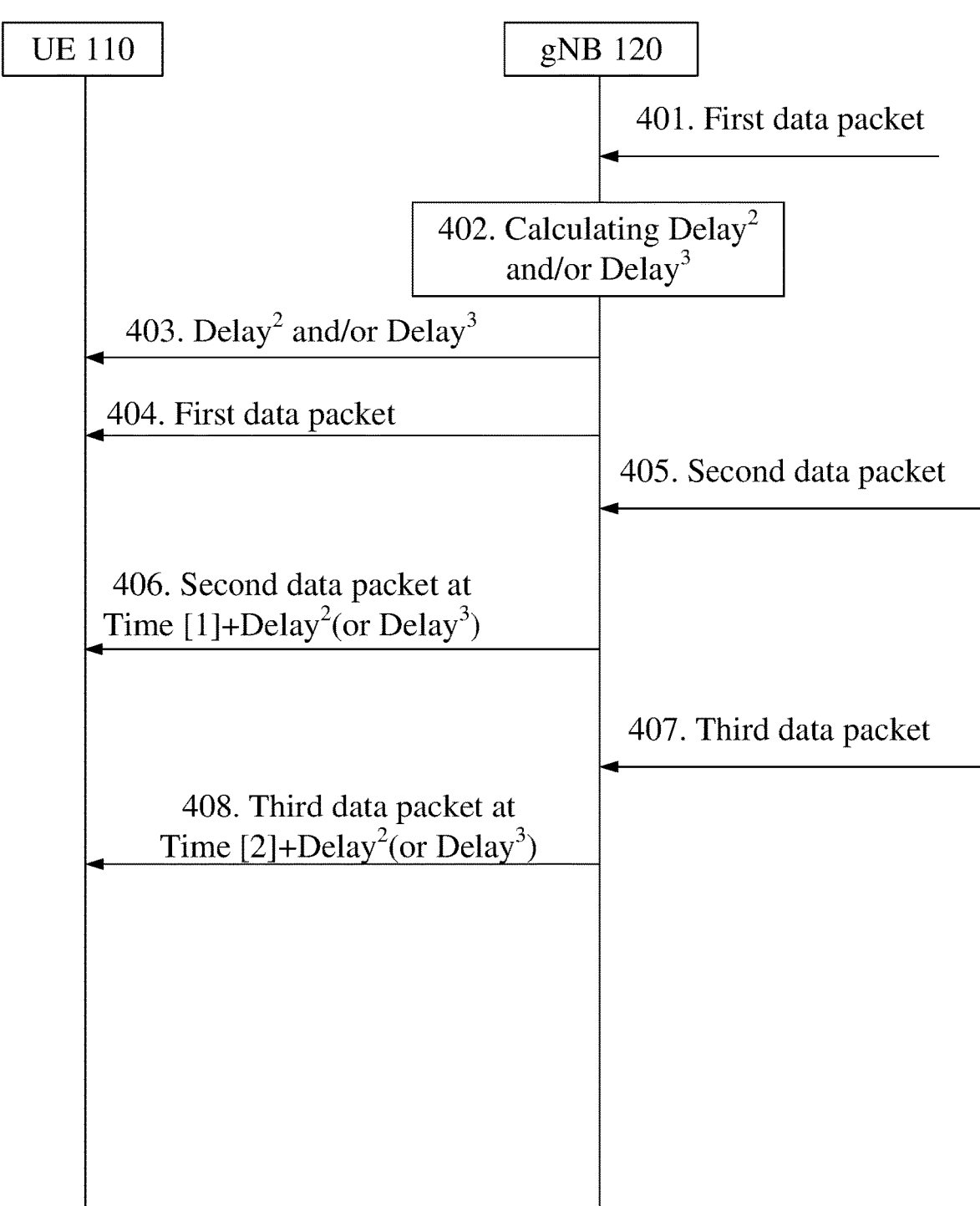
FIG. 4 shows the illustration of the RAN downlink scheduling optimization with credit-based shaper (CBS) parameters for time sensitive communication (TSC) traffic according to another example embodiment of the present disclosure.

FIG. 4 shows the illustration of the RAN downlink scheduling optimization with credit-based shaper (CBS) parameters for time sensitive communication (TSC) traffic according to another example embodiment of the present disclosure. Optionally, the gNB 120 may transmit to the UE 110 Delay$^2$ and/or Delay$^3$ calculated by the gNB 120 in the operation 230 before the gNB 120 transmits the first data packet to the UE110. As shown in FIG. 4, at step 401, the gNB 120 may receive a first data packet from a network entity which may be a core network 130. At step 402, the gNB 120 may calculate two types of delays Delay$^2$ and/or Delay$^3$ based on the parameters associated with a type of traffic shaper. Then at step 403, the gNB may transmit scheduling information and the two types of delays Delay$^2$ and/or Delay$^3$ to UE 110. At step 404, the gNB may transmit the first data packet to the UE 110. After receiving the second data packet at step 405, the gNB 120 may transmit the second data packet to UE 110 according to Delay$^2$ and/or Delay$^3$ relative to the transmission time of the first data packet at step 406. Similarly, after receiving the third data packet at step 407, the gNB 120 may transmit the third data packet to UE 110 according to Delay$^2$ and/or Delay$^3$ relative to the second packet transmission time at step 408. Specifically, in the example embodiment shown in FIG. 4, the gNB 120 may indicate two groups of the PDCCH occasions for the subsequent packets in the first or second scheduling message for UE 110 monitoring.

One group, group 1, may involve the second type of time delay:

$$Delay^2 = Time^2[i] - Time[i-1] = MaxFrameSize/operIdleSlope \qquad (2)$$

Another group, group 2, may involve the third type of time delay:

$$Delay^3 = \qquad (3)$$
$$Time^3[i] - Time[i-1] = MaxFrameSize/operIdleSlope + delayOffset$$

UE 110 may do PDCCH skipping after it receives the first packet in a burst at step 404. Then UE 110 may monitor the PDCCH on Time$^2$[2] (=Time[1]+Delay$^2$) for the second packet. If there is no scheduling information, UE 110 may do PDCCH skipping again and monitor the PDCCH on Time³ [2](=Time[1]+Delay³). Because whether there is a conflicting packet or not is unpredictable, UE 110 may only monitor group 1 first and then decide whether to monitor group 2. This period ends when UE 110 receives the second packet on the Time²[2] or when UE 110 receives the second packet on the Time³[2]. After that, UE 110 may repeat the same operation for the subsequent packets.

In another example embodiment, in the operation 230, the gNB 120 may calculate a fourth type of time delay for the $i^{th}$ data packet by using a fourth equation:

$$\text{Delay}^4[i] = \text{Time}^4[i] - \text{Time}[i-1] = \text{Size}[i-1]/operIdleSlope \quad (4)$$

and/or calculate a fifth type of time delay for the $i^{th}$ data packet by using a fifth equation:

$$\text{Delay}^5[i] = \quad (5)$$
$$\text{Time}^5[i] - \text{Time}[i-1] = \text{Size}[i-1]/operIdleSlope + delayOffset$$

and then in the operation 240, the gNB 120 may transmit, to the UE 110, the $i^{th}$ data packet at Time⁴[i] described by the fourth equation: Time⁴[i]=Time[i−1]+Delay⁴ or at Time⁵[i] described by the fifth equation: Time⁵[i]=Time[i−1]+Delay⁵, wherein i may be an integer larger than 1, Time⁴[i] or Time⁵[i] may be candidate transmission time for the $i^{th}$ data packet, and Time[i−1] is the actual transmission time for the $(i-1)^{th}$ data packet.

In one example embodiment, delayOffset may be determined by the following equation:

$$delayOffset = (\text{maximum}(EthernetFrameSize))/portTransmitRate \quad (6)$$

and EthernetFrameSize is the number of bits per frame in Ethernet. delayOffset may be used to describe the delay caused by other conflicting traffic classes when the traffic of TSN system side is heavily loaded. For example, if the traffic of TSN system side is lightly loaded, it may be assumed that no packet of other traffic class conflicts with subsequent packets and then the delay of the second packet relative to the first packet is Delay⁴=Size[1]/operIdleSlope. If the traffic of TSN system side is heavily loaded, there may be one packet of other traffic class conflicting with subsequent packets, which would introduce interference and delay the transmission. Then the delay of second packet relative to the first packet is Delay⁵=Size[1]/operIdleSlope+(maximum (EthernetFrameSize))/portTransmitRate.

Specifically, in one example embodiment, the gNB 120 may transmit to the UE 110 Time⁴[i] and Time⁵[i] calculated by the gNB 120 in the operation 230, before the gNB 120 transmits the $i^{th}$ data packet to the terminal device to the UE 110 in the operation 240. FIG. 5 shows the illustration of the RAN downlink scheduling optimization with credit-based shaper (CBS) parameters for time sensitive communication (TSC) traffic according to another example embodiment of the present disclosure. Referring to FIG. 5, the UE 110 may receive from the gNB 120, Time⁴[i] and Time⁵[i] calculated by the gNB 120 before the gNB 120 transmits the $i^{th}$ data packet to the UE 110.

For example, as shown in FIG. 5, at step 501, the gNB 120 may receive a first data packet from a network entity which may be the core network 130. At step 502, the gNB 120 may calculate candidate transmission time Time⁴[2] and/or Time⁵[2] for the second data packet based on the parameters and the size of the first data packet. Then at step 503, the gNB may transmit scheduling information for the first data packet and the candidate transmission time Time⁴[2] and/or Time⁵[2] for the second data packet to UE 110. At step 504, the gNB may transmit the first data packet to the UE 110. After receiving the second data packet at step 505, the gNB 120 may calculate the candidate transmission time Time⁴[3] and/or Time⁵[3] for the third data packet based on the parameters and the size of the second data packet at step 506. Then the gNB 120 may transmit scheduling information for the second data packet and the candidate transmission time Time⁴[3] and/or Time⁵[3] for the third data packet at step 507. Then at step 508, the gNB may transmit the second data packet to UE 110 at Time⁴[2] or Time⁵[2]. Similarly, after receiving the third data packet at step 509, the gNB 120 may calculate the candidate transmission time Time⁴[4] and/or Time⁵[4] for the fourth data packet at step 510 and transmit Time⁴[4] and/or Time⁵[4] to UE 110 at step 511. Then at step 512, the gNB may transmit the third data packet to UE 110 at Time⁴[3] or Time⁵[3]. Specifically, in the example embodiment shown in FIG. 5, the gNB 120 may indicate two PDCCH occasions of the next packet in current scheduling message for UE 110 monitoring:

One occasion may be described by Time⁴[i] in the fourth equation as follow:

$$\text{Time}^4[i] = \text{Time}[i-1] + \text{Size}[i-1]/operIdleSlope \quad (4)$$

Another occasion may be described by Time⁵[i] in the fifth equation as follow:

$$\text{Time}^5[i] = \text{Time}[i-1] + \text{Size}[i-1]/operIdleSlope + \quad (5)$$
$$(\text{maximum}(EthernetFrameSize))/portTransmitRate$$

UE 110 may decode the scheduling information of first packet and know that the second packet in burst may arrive at Time⁴[2] or Time⁵[2] at step 503, which are calculated by using the actual size of the first packet Size[1] by the gNB at step 502. Then UE 110 may do PDCCH skipping after it receives the first packet. It monitors the PDCCH on Time⁴ [2] for second packet. If there is no scheduling information, the UE 110 may do PDCCH skipping again and monitor the PDCCH on Time⁵[2]. UE 110 may obtain two PDCCH monitoring occasions Time⁴[3] or Time⁵[3] of the third packet when it decodes the scheduling information of second packet whether it is on the Time⁴[2] or Time⁵[2]. After that, UE 110 repeats the same operation for the subsequent packets.

The advantage of the example embodiment shown FIG. 5 compared to the example embodiment shown in FIG. 4 is that there is hardly any latency due to resource scheduling. The reason is that the example embodiment shown FIG. 5 applies the actual size of the previous packet to predict the arrival time of next packet. But the difference is that scheduling information of each packet should contain these predicted arrival time of next packet, i.e. PDCCH occasions for UE 110 monitoring. Similarly, UE 110 may decrease the power consumption because it does not monitor the PDCCH one by one.

In another example embodiment, the gNB 120 may transmit, to the UE 110, the parameters, such as those associated with CBS, and at least one equation for calculating the at least one time delay for the at least one subsequent data packet; and synchronize with the UE 110 for transmission of the at least one subsequent data packet. On the other hand, the UE 110 may receive from the network device, the parameters associated with CBS and at least one equation for calculating the at least one time delay for the at least one subsequent data packet; and synchronize with the gNB 120 for receiving the at least one subsequent data packet. Then the UE 110 may calculate the at least one time delay for the at least one subsequent data packet based on the parameters associated with CBS by using the at least one time delay equation.

Figure 6:
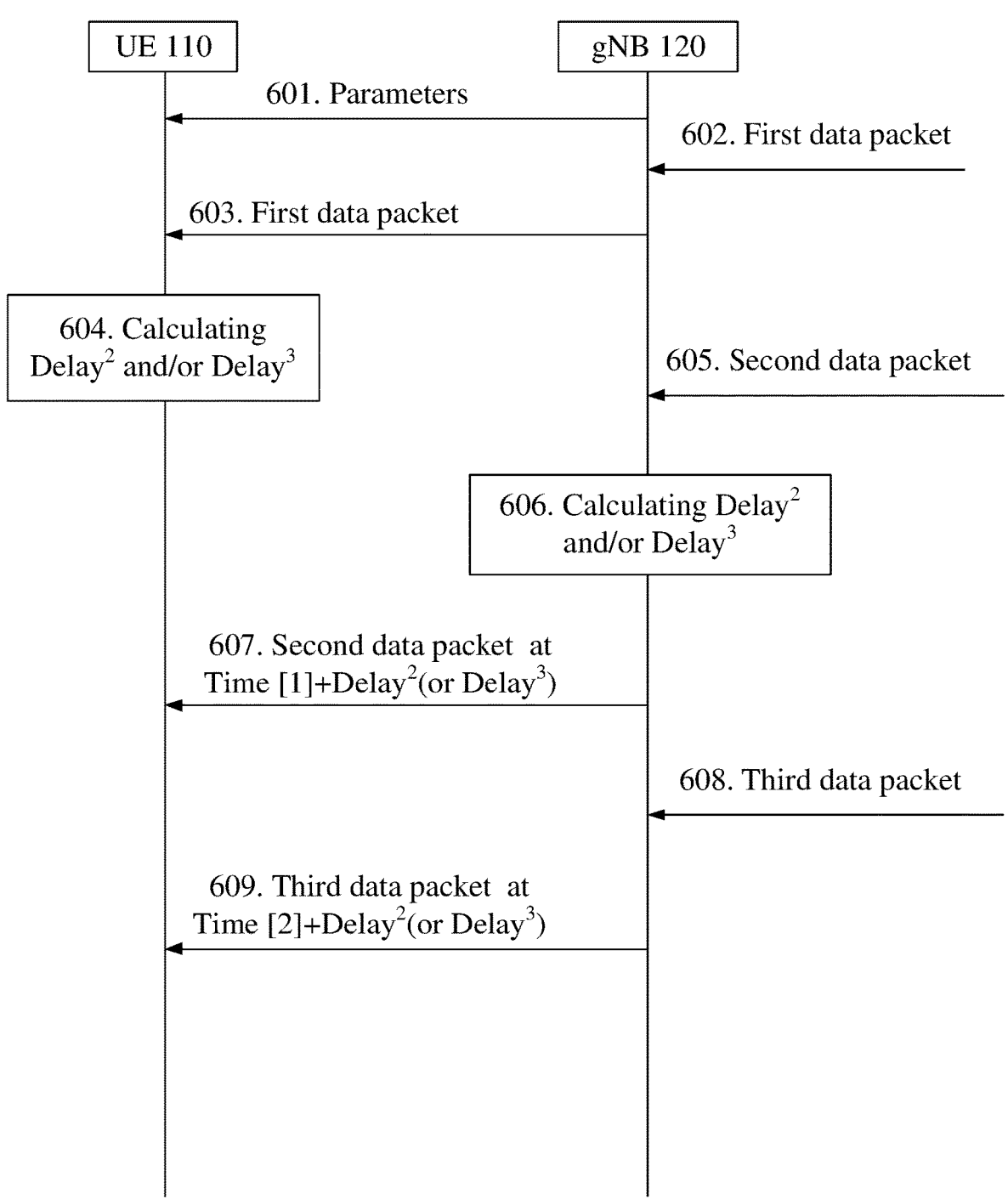
FIG. 6 shows the illustration of the RAN downlink scheduling optimization with credit-based shaper (CBS) parameters for time sensitive communication (TSC) traffic according to another example embodiment of the present disclosure.
Figure 7:
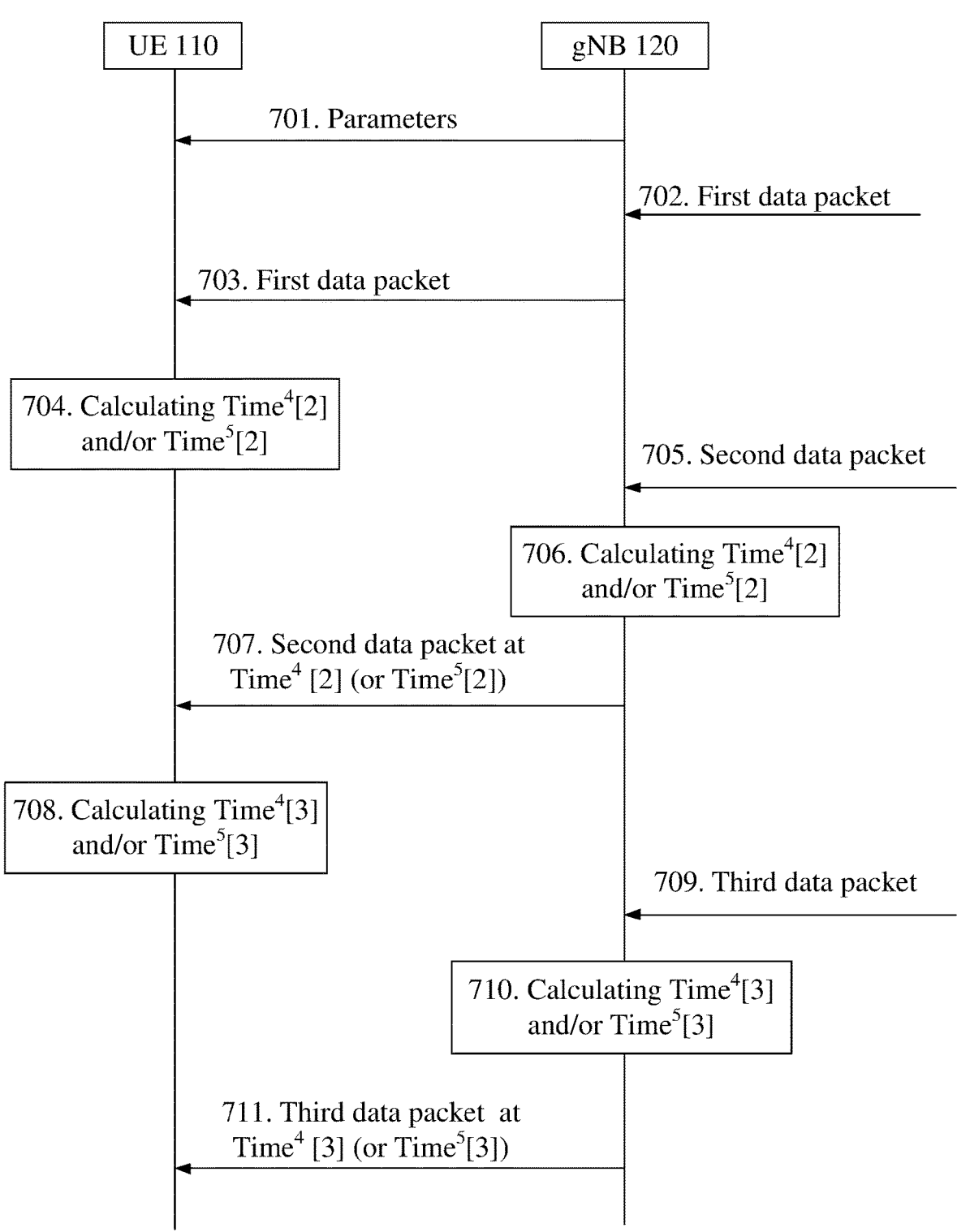
FIG. 7 shows the illustration of the RAN downlink scheduling optimization with credit-based shaper (CBS) parameters for time sensitive communication (TSC) traffic according to another example embodiment of the present disclosure.

For example, as shown in FIG. 6 or FIG. 7, Parameters such as TSCAI with added-on assistant information may be delivered to UE 110, and then the gNB 120 and UE 110 may apply the consistent prediction algorithm using the same equation to keep gNB 120's scheduling occasion aligned with UE 110's PDCCH monitoring. TSCAI with added-on assistant information may comprise CBS parameters, such as MaxFrameSize, operIdleSlope, and/or portTransmitRate. The example embodiment of FIG. 6 or FIG. 7 is to put the same prediction on both sides (the UE 110 and the gNB 120). The prediction may be done in UE 110 and gNB 120 independently. In order to keep the consistency of the gNB 120 scheduling and UE 110 monitoring, gNB 120 should deliver the TSCAI with added-on assistant information to UE 110, specify the consistent prediction algorithm both in gNB 120 and UE 110, and synchronize with UE 110 for scheduling message transmission in gNB 120 and PDCCH monitoring in UE 110. In one example embodiment, the UE 110 and the gNB 120 may apply the same base time to calculate the scheduling and PDCCH monitoring time for the current $i^{th}$ packet. For example, the base time may be Time[i−1], the transmission time of $(i-1)^{th}$ packet.

For example, as shown in FIG. 6, at step 601, the gNB 120 may transmit parameters associated with a type of traffic shaper and at least one time delay equation for calculating time delays for the subsequent data packets to the UE 110, and synchronize with the UE 110 for subsequent data packet transmission. At step 602, the gNB 120 may receive a first data packet from a network entity which may be a core network 130. At step 603, the gNB 120 may transmit the first data packet to the UE 110. Then at step 604, the UE 110 may calculate two types of delays $Delay^2$ and/or $Delay^3$ based on the parameters and the time delay equations. After receiving the second data packet at step 605, the gNB 120 may calculate two types of delays $Delay^2$ and/or $Delay^3$. Then at step 607, the gNB may transmit the second data packet to UE 110 according to $Delay^2$ and/or $Delay^3$ relative to the first packet transmission time. Similarly, after receiving the third data packet at step 608, the gNB 120 may transmit the third data packet to UE 110 according to $Delay^2$ and/or $Delay^3$ relative to the second packet transmission time at step 609. Specifically, as shown in FIG. 6, the gNB 120 and UE 110 may both calculate two groups of the PDCCH occasions for subsequent dtaa packets based on the parameters, or TSCAI with added-on assistant information, for RAN scheduling and UE monitoring.

One group, group 1, may involve the second type of time delay determined by the second equation:

$$Delay^2 = Time^2[i] - Time[i-1] = MaxFrameSize/operIdleSlope \quad (2)$$

Another group, group 2, may involve the third type of time delay determined by the third equation:

$$Delay^3 = Time^3[i] - Time[i-1] = MaxFrameSize/operIdleSlope + \quad (3)$$
$$(maximum \, (EthernetFrameSize))/portTransmitRate$$

UE 110 may do PDCCH skipping after it receives the first packet in burst. Then UE 110 may monitor the PDCCH on $Time^2[2](=Time[1]+Delay^2)$ for second packet. If there is no scheduling information, UE 110 may do PDCCH skipping again and monitor the PDCCH on $Time^3[2](=Time[1]+Delay^3)$. Based on the consistency of the prediction, the consistency of the RAN scheduling and UE monitoring, gNB 120 transmits the second packet on the $Time^2[2]$ or $Time^3[2]$ definitely.

Similarly, in another example embodiment, as shown in FIG. 7, at step 701, the gNB 120 may transmit parameters associated with a type of traffic shaper and at least one time delay equation for calculating time delays for the subsequent data packets to the UE 110, and synchronize with the UE 110 for subsequent data packet transmission. At step 702, the gNB 120 may receive a first data packet from a network entity which may be a core network 130. At step 703, the gNB 120 may transmit the first data packet to the UE 110. Then at step 704, the UE 110 may calculate candidate transmission time $Time^4[2]$ and/or $Time^5[2]$ for the second data packet based on the received parameters, the time delay equations and the size of the first data packet. After receiving the second data packet at step 705, the gNB 120 may also calculate candidate transmission time $Time^4[2]$ and/or $Time^5[2]$ for the second data packet at step 706. Then at step 707, the gNB may transmit the second data packet to UE 110 at $Time^4[2]$ or $Time^5[2]$. Similarly, after receiving the second data packet, the UE 110 may calculate the candidate transmission time $Time^4[3]$ and/or $Time^5[3]$ for the third data packet at step 708 based on the received parameters, the time delay equations and the size of the second data packet. Then after receiving the third data packet at step 709, the gNB 120 may calculate the candidate transmission time $Time^4[3]$ and/or $Time^5[3]$ for the third data packet at step 710. Then at step 711, the gNB may transmit the third data packet to UE 110 at $Time^4[3]$ or $Time^5[3]$. Specifically, in the example embodiment as shown in FIG. 7, when the $(i-1)^{th}$ packet is received by UE 110, UE 110 may calculate two PDCCH monitoring occasions of the ith packet based on the size of received packet by using the fourth and the fifth equation as described above.

For example, one occasion may be described by $Time^4[i]$ in the fourth equation as follow:

$$Time^4[i] = Time[i-1] + Size[i-1]/operIdleSlope \quad (4)$$

Another occasion may be described by $Time^5[i]$ in the fifth equation as follow:

$$Time^5[i] = Time[i-1] + Size[i-1]/operIdleSlope + \qquad (5)$$
$$(maximum\ (EthernetFrameSize))/portTransmitRate$$

UE 110 may do PDCCH skipping after it receives the first packet in burst. Then it monitors the PDCCH on $Time^4[2]$ for second packet. If there is no scheduling information, UE 110 may do PDCCH skipping again and monitor the PDCCH on $Time^5[2]$. Based on the consistency of the prediction, the consistency of the RAN scheduling and UE monitoring, gNB 120 may transmit the second packet on the $Time^4[2]$ or $Time^5[2]$ definitely. In this example embodiment, UE 110 may calculate the PDCCH monitoring occasions after each packet is received and its size is obtained.

In the example embodiment shown in FIG. 6 or FIG. 7, no changes were made to the radio resource scheduling message at the cost of delivering CBS related parameters to UE 110, and packet arrival time prediction is also done at the UE side. In FIGS. 6-7, the detailed description of the downlink scheduling in gNB is omitted for simplicity.

According to the present disclosure, the 5GS core network 130 may convey TSCAI with added-on assistant information to the RAN 125. The added-on assistant information may include one or more below parameters associated CBS: MaxFrameSize, operIdleSlope, and/or classMeasurementInterval. The RAN 125 may determine scheduling method as dynamic scheduling or semi-static/configured scheduling depending on received added-on assistant information. In one example embodiment, the RAN may use the classMeasurementInterval to make such decision. The RAN 125 may derive the arrival time of potential subsequent frames upon receiving the first frame per burst. The RAN 125 may schedule those frames using the derived arrival time and received added-on assistant information. The UE 110, upon receiving the added-on assistant information from the RAN 125, may predict physical downlink control channel (PDCCH) monitoring occasion for subsequent packets within the same burst after detecting and decoding the downlink the PDCCH successfully for the first packet.

Figure 8:
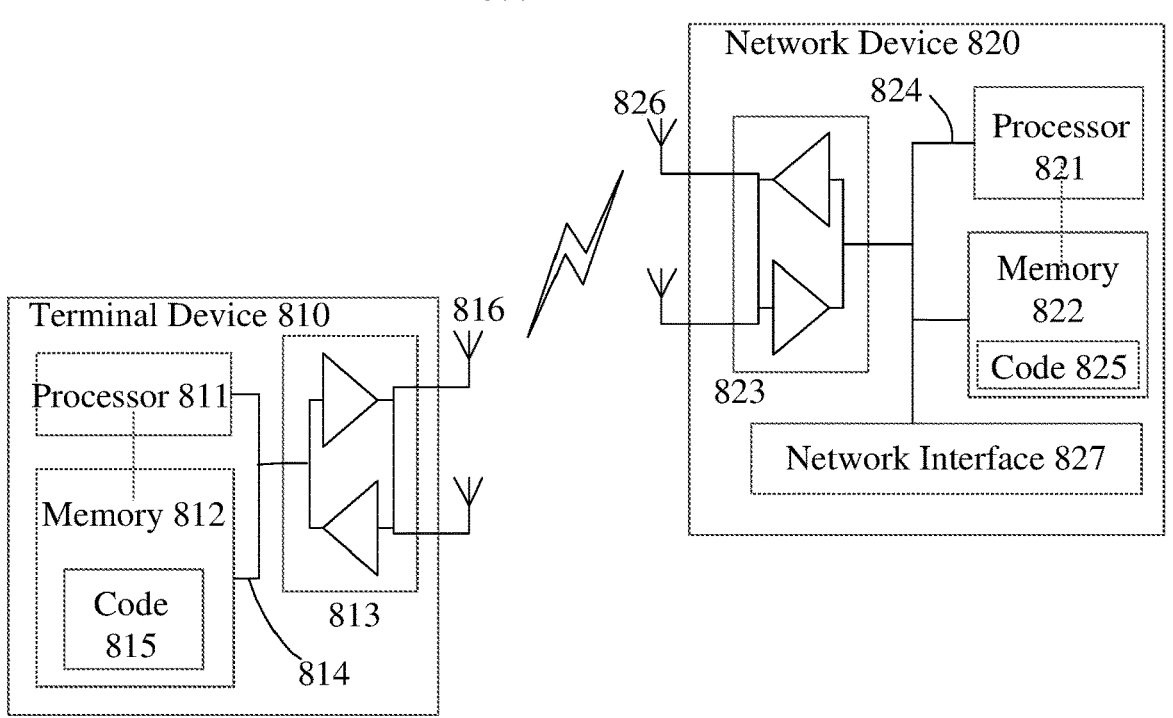
FIG. 8 shows a block diagram illustrating an example communication network 800 for radio access network (RAN) downlink (DL) scheduling optimization with credit-based shaper (CBS) parameters in which example embodiments of the present disclosure can be implemented.

FIG. 8 is a block diagram illustrating a communication network 800 in which example embodiments of the present disclosure can be implemented. The communication network 800 may be a part of a larger communication network or system. As shown in FIG. 8, the communication network 800 may include a terminal device 810 which may be implemented as the UE 110 discussed above, and a network device 820 which may be implemented as the base station (gNB) 120 discussed above.

Referring to FIG. 8, the terminal device 810 may comprise one or more processors 811, one or more memories 812 and one or more transceivers 813 interconnected through one or more buses 814. The one or more buses 814 may be address, data, or control buses, and may include any interconnection mechanism such as series of lines on a motherboard or integrated circuit, copper cables, optical fibers, or other electrical/optical communication equipment, and the like. Each of the one or more transceivers 813 may comprise a receiver and a transmitter, which are connected to a plurality of antennas 816. The plurality of antennas 816 may form an antenna array to perform beamforming communication with the network device 820. The one or more memories 812 may include computer program code 815.

The one or more memories 812 and the computer program code 815 may be configured to, when executed by the one or more processors 811, cause the terminal device 810 to perform operations and procedures relating to the UE 110 as described above.

The network device 820 may be implemented as a single network node, or disaggregated/distributed over two or more network nodes, such as a central unit (CU), a distributed unit (DU), a remote radio head-end (RRH), using different functional-split architectures and different interfaces. The network device 820 may comprise one or more processors 821, one or more memories 822, one or more transceivers 823 and one or more network interfaces 827 interconnected through one or more buses 824. The one or more buses 824 may be address, data, or control buses, and may include any interconnection mechanism such as a series of lines on a motherboard or integrated circuit, copper cables, optical fibers, or other electrical/optical communication equipment, and the like. Each of the one or more transceivers 823 may comprise a receiver and a transmitter, which are connected to a plurality of antennas 826. The network device 820 may operate as a base station for the terminal device 810 and wirelessly communicate with the terminal device 810 through the plurality of antennas 826.

The plurality of antennas 826 may form an antenna array to perform beamforming communication with the terminal device 810. The one or more network interfaces 827 may provide wired or wireless communication links through which the network device 820 may communicate with other network devices, entities or functions. The one or more memories 822 may include computer program code 825. The one or more memories 822 and the computer program code 825 may be configured to, when executed by the one or more processors 821, cause the network device 820 to perform operations and procedures relating to the base station (gNB) 120 as described above.

The one or more processors 811, 821 discussed above may be of any appropriate type that is suitable for the local technical network, and may include one or more of general purpose processors, special purpose processor, microprocessors, a digital signal processor (DSP), one or more processors in a processor based multi-core processor architecture, as well as dedicated processors such as those developed based on Field Programmable Gate Array (FPGA) and Application Specific Integrated Circuit (ASIC). The one or more processors 811, 821 may be configured to control other elements of the UE/network device and operate in cooperation with them to implement the procedures discussed above.

The one or more memories 812, 822 may include at least one storage medium in various forms, such as a volatile memory and/or a non-volatile memory. The volatile memory may include but not limited to for example a random access memory (RAM) or a cache. The non-volatile memory may include but not limited to for example a read only memory (ROM), a hard disk, a flash memory, and the like. Further, the one or more memories 812, 822 may include but not limited to an electric, a magnetic, an optical, an electromagnetic, an infrared, or a semiconductor system, apparatus, or device or any combination of above.

Figure 9:
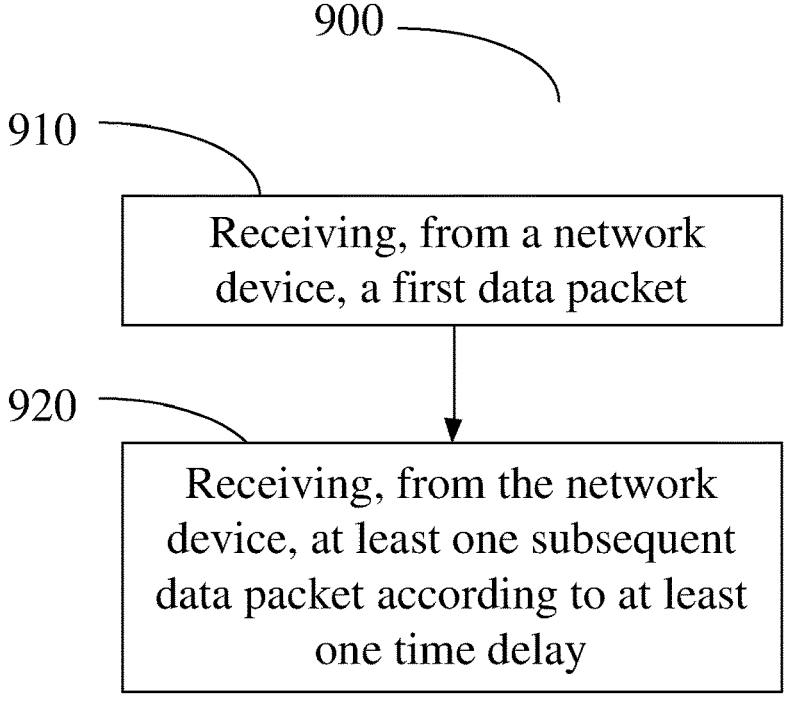
FIG. 9 shows a flow chart illustrating an example method 900 for scheduling optimization for telecommunication systems according to an example embodiment of the present disclosure.

FIG. 9 shows a flow chart illustrating an example method 900 for scheduling optimization for telecommunication systems according to an example embodiment of the present disclosure. The example method 900 may be performed for example at a terminal device such as the UE 110.

Referring to the FIG. 9, the example method 900 may include a step 910 of receiving, from a network device, a first data packet; and a step 920 of receiving, from the network device, at least one subsequent data packet according to at least one time delay. The at least one time delay is calculated for the at least one subsequent data packet based on parameters associated with a type of traffic shaper.

Details of the step 910 have been described in above descriptions with respect to at least the operation 210, and repetitive descriptions thereof are omitted here.

Details of the step 920 have been described in above descriptions with respect to at least the operation 220, and repetitive descriptions thereof are omitted here.

In an example embodiment, the type of traffic shaper is credit-based shaper (CBS) and the parameters associated with CBS further comprise: MaxFrameSize, operIdleSlope, and/or portTransmitRate.

In an example embodiment, the at least one delay is calculated in a case where the network device determines that one of the parameters associated with CBS classMeasurementInterval is larger than a threshold.

In an example embodiment, the at least one time delay comprises: a first type of time delay calculated for the $i^{th}$ data packet by using a first equation: $Delay^1=Time^1[i]-Time[i-1]=MaxFrameSize/operIdleSlope+delayOffset$, and receiving, from a network device, at least one subsequent data packet according to at least one time delay further comprises: receiving, from the network device, the $i^{th}$ data packet at $Time^1[i]$ described by the first equation: $Time^1[i]=Time[i-1]+Delay^1$, i being an integer larger than 1, $Time^1[i]$ being the transmission time of the $i^{th}$ data packet and Time[i-1] being the actual transmission time for the $(i-1)^{th}$ data packet.

In an example embodiment, the at least one time delay comprises: a second type of time delay calculated for the $i^{th}$ data packet by using a second equation: $Delay^2=Time^2[i]-Time^2[i-1]=MaxFrameSize/operIdleSlope$; and/or a third type of time delay calculated for the $i^{th}$ data packet by using a third equation: $Delay^3=Time^3[i]-Time^3[i-1]=MaxFrameSize/operIdleSlope+delayOffset$, and receiving, from a network device, at least one subsequent data packet according to at least one time delay further comprises: receiving, from the network device, the $i^{th}$ data packet at $Time^2[i]$ described by the second equation: $Time^2[i]=Time[i-1]+Delay^2$ or at $Time^3[i]$ described by the third equation: $Time^3[i]=Time[i-1]+Delay^3$, wherein i being an integer larger than 1, $Time^2[i]$ or $Time^3[i]$ may be candidate transmission time for the $i^{th}$ data packet, and Time[i-1] is the actual transmission time for the $(i-1)^{th}$ data packet.

In an example embodiment, the at least one time delay comprises: a fourth type of time delay calculated for the $i^{th}$ data packet by using a fourth equation: $Delay^4[i]=Time^4[i]-Time[i-1]=Size[i-1]/operIdleSlope$; and/or a fifth type of time delay calculated for the $i^{th}$ data packetb by using a fifth equation: $Delay^5[i]=Time^5[i]-Time[i-1]=Size[i-1]/operIdleSlope+delayOffset$, and receiving, from a network device, at least one subsequent data packet according to at least one time delay further comprises: receiving, from the network device, the $i^{th}$ data packet at $Time^4[i]$ described by the fourth equation: $Time^4[i]=Time[i-1]+Delay^4$ or at $Time^5[i]$ described by the fifth equation: $Time^5[i]=Time[i-1]+Delay^5$, wherein i may be an integer larger than 1, $Time^4[i]$ or $Time^5[i]$ may be candidate transmission time for the $i^{th}$ data packet, Time[i-1] is the actual transmission time for the $(i-1)^{th}$ data packet, and Size[i-1] is the actual size of the $(i-1)^{th}$ data packet.

In an example embodiment, $delayOffset=(maximum(EthernetFrameSize))/portTransmitRate$; and EthernetFrameSize is the number of bits per frame in Ethernet.

In an example embodiment, the method 900 further comprises: receiving, from the network device, the parameters associated with CBS and at least one equation for calculating the at least one time delay for the at least one subsequent data packet; and synchronizing with the network device for receiving the at least one subsequent data packet, wherein the method calculates the at least one time delay for the at least one subsequent data packet based on the parameters associated with CBS using the at least one time delay equation.

In an example embodiment, the method 900 further comprises: receiving, from the network device, $Delay^1$ calculated by the network device before receiving the second data packet from the network device.

In an example embodiment, the method 900 further comprises: receiving, from the network device, $Delay^2$ and/or $Delay^3$ calculated by the network before receiving the second data packet from the network device.

In an example embodiment, the method 900 further comprises: receiving, from the network device, $Time^4[i]$ and/or $Time^5[i]$ calculated by the network device before receiving the ith data packet from the network device.

In an example embodiment, $Delay^1$, $Delay^2$ or $Delay^3$ is received through the scheduling signaling or MAC CE or RRC signaling.

In an example embodiment, the method 900 further comprises: before receiving, from the network device, a subsequent data packet according to the at least one time delay, monitoring a physical downlink control channel (PDCCH) scheduling the reception of said subsequent data packet.

FIG. 10 shows a flow chart illustrating an example method 1000 for scheduling optimization for telecommunication systems according to an example embodiment of the present disclosure. The example method 1000 may be performed for example at a network device such as the gNB 120.

Referring to the FIG. 10 the example method 1000 may include a step 1010 of receiving, from a network entity, parameters associated with a type of traffic shaper; a step 1020 of receiving, from the network entity, a first data packet; a step 1030 of calculating at least one time delay for at least one subsequent data packet based on the parameters associated with the type of traffic shaper; and a step 1040 of transmitting, to a terminal device, the at least one subsequent data packet according to the at least one time delay.

Details of the step 1010 have been described in above descriptions with respect to at least the operation 210, and descriptions thereof are omitted here.

Details of the step 1020 have been described in above descriptions with respect to at least the operation 220, and descriptions thereof are omitted here.

Details of the step 1030 have been described in above descriptions with respect to at least the operation 230, and descriptions thereof are omitted here.

Details of the step 1040 have been described in above descriptions with respect to at least the operation 240, and descriptions thereof are omitted here.

In an example embodiment, the type of traffic shaper is credit-based shaper (CBS), and the parameters associated with CBS further comprise: MaxFrameSize, operIdleSlope, and/or portTransmitRate.

In an example embodiment, the at least one delay is calculated in a case where the network device determines that one of the parameters associated with CBS classMeasurementInterval is larger than a threshold.

In an example embodiment, calculating at least one time delay for at least one subsequent data packet based on parameters associated with CBS further comprises: calculating a first type of time delay for the $i^{th}$ data packet by using a first equation: $Delay^1 = Time^1[i] - Time[i-1] = MaxFrameSize/operIdleSlope + delayOffset$; and transmitting, to a terminal device, the at least one subsequent data packet according to the at least one time delay further comprises: transmitting, to the terminal device, the $i^{th}$ data packet at $Time^1[i]$ described by the first equation: $Time^1[i] = Time[i-1] + Delay^1$, i being an integer larger than 1, $Time^1[i]$ being transmission time of the $i^{th}$ data packet and $Time[i-1]$ being the actual transmission time for the $(i-1)^{th}$ data packet.

In an example embodiment, calculating at least one time delay for at least one subsequent data packet based on parameters associated with CBS further comprises: calculating a second type of time delay for the $i^{th}$ data packet by using a second equation: $Delay^2 = Time^2[i] - Time[i-1] = MaxFrameSize/operIdleSlope$; and/or calculating a third type of time delay for the $i^{th}$ data packet by using a third equation: $Delay^3 = Time^3[i] - Time[i-1] = MaxFrameSize/operIdleSlope + delayOffset$; and transmitting, to a terminal device, the at least one subsequent data packet according to the at least one time delay further comprises: transmitting, to the terminal device, the $i^{th}$ data packet at $Time^2[i]$ described by the second equation: $Time^2[i] = Time[i-1] + Delay^2$ or at $Time^3[i]$ described by the third equation: $Time^3[i] = Time[i-1] + Delay^3$, wherein i may be an integer larger than 1, $Time^2[i]$ or $Time^3[i]$ may be candidate transmission time for the $i^{th}$ data packet, and $Time[i-1]$ is the actual transmission time for the $(i-1)^{th}$ data packet.

In an example embodiment, calculating at least one time delay for at least one subsequent data packet based on parameters associated with CBS further comprises: calculating a fourth type of time delay for the $i^{th}$ data packet by using a fourth equation: $Delay^4[i] 32 Time^4[i] - Time[i-1] = Size[i-1]/operIdleSlope$; and/or calculating a fifth type of time delay for the $i^{th}$ data packet by using a fifth equation: $Delay^5[i] = Time^5[i] - Time[i-1] = Size[i-1]/operIdleSlope + delayOffset$; and transmitting, to a terminal device, the at least one subsequent data packet according to the at least one time delay further comprises: transmitting, to the terminal device, the $i^{th}$ data packet at $Time^4[i]$ described by the fourth equation: $Time^4[i] = Time[i-1] + Delay^4$ or at $Time^5[i]$ described by the fifth equation: $Time^5[i] = Time[i-1] + Delay^5$, wherein i may be an integer larger than 1, $Time^4[i]$ or $Time^5[i]$ may be candidate transmission time for the $i^{th}$ data packet, $Time[i-1]$ is the actual transmission time for the $(i-1)^{th}$ data packet, and $Size[i-1]$ being the actual size of the $(i-1)^{th}$ data packet.

In an example embodiment, delayOffset=(maximum (EthernetFrameSize))/portTransmitRate; and EthernetFrameSize is the number of bits per frame in Ethernet.

In an embodiment, the method 1000 further comprises: transmitting, to the terminal device, the parameters associated with CBS and at least one equation for calculating the at least one time delay for the at least one subsequent data packet; and synchronizing with the terminal device for transmission of the at least one subsequent data packet, wherein the terminal device calculates the at least one time delay for the at least one subsequent data packet based on the parameters associated with CBS using the at least one time delay equation.

In an example embodiment, the method 1000 further comprises: transmitting, to the terminal device, $Delay^1$ calculated by the network device before transmitting the second data packet to the terminal device.

In an example embodiment, the method 1000 further comprises: transmitting, to the terminal device, $Delay^2$ and/or $Delay^3$ calculated by the network before transmitting the second data packet to the terminal device.

In an example embodiment, the method 1000 further comprises: transmitting, to the terminal device, $Time^4[i]$ and/or $Time^5[i]$ calculated by the network device before transmitting the ith data packet to the terminal device.

In an example embodiment, $Delay^1$, $Delay^2$ or $Delay^3$ is transmitted through the scheduling signaling or MAC CE or RRC signaling.

Figure 11:
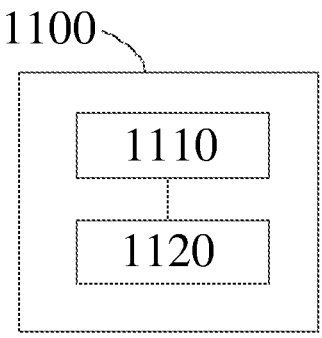
FIG. 11 shows a block diagram illustrating an example apparatus 1100 for scheduling optimization for telecommunication systems according to an example embodiment of the present disclosure.

FIG. 11 shows a block diagram illustrating an example apparatus 1100 for scheduling optimization for telecommunication systems according to an example embodiment of the present disclosure. Apparatus, for example, may be at least part of the UE 110 in above examples.

As shown in FIG. 11, the example apparatus 1100 may include means 1110 for performing the step 910 of the example method 900, and means 1120 for performing the step 920 of the example method 900. In one or more another example embodiment, at least one I/O interface, at least one antenna element, and the like may also be included in the example apparatus 1100.

In some example embodiments, examples of means in the example apparatus 1100 may include circuitries. For example, an example of means 1110 may include a circuitry configured to perform the step 910 of the example method 900, and an example of means 1120 may include a circuitry configured to perform the step 920 of the example method 900. In some example embodiments, examples of means may also include software modules and any other suitable function entities.

Figure 12:
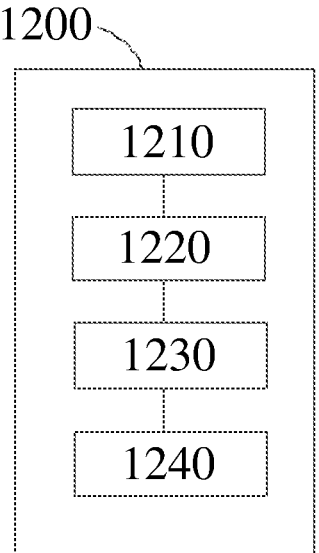
FIG. 12 shows a block diagram illustrating an example apparatus 1200 for scheduling optimization for telecommunication systems according to an example embodiment of the present disclosure.

FIG. 12 shows a block diagram illustrating an example apparatus 1200 for scheduling optimization for telecommunication systems according to an example embodiment of the present disclosure. Apparatus, for example, may be at least part of the gNB 120 in above examples.

As shown in the FIG. 12, the example apparatus 1200 may include means 1210 for performing the step 1010 of the example method 1000; means 1220 for performing the step 1020 of the example method 1000; means 1230 for performing the step 1030 of the example method 1000; and means 1240 for performing the step 1040 of the example method 1000.

In some example embodiments, examples of means in the example apparatus 1200 may include circuitries. For example, an example of means 1210 may include a circuitry configured to perform the step 1010 of the example method 1000; an example of means 1220 may include a circuitry configured to perform the step 1020 of the example method 1000; an example of means 1230 may include a circuitry configured to perform the step 1030 of the example method 1000; and an example of means 1240 may include a circuitry configured to perform the step 1040 of the example method 1000. In some example embodiments, examples of means may also include software modules and any other suitable function entities.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory (ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to one or all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Another example embodiment may relate to computer program codes or instructions which may cause an apparatus to perform at least respective methods described above. Another example embodiment may be related to a computer readable medium having such computer program codes or instructions stored thereon. In some embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on. The non-volatile memory may also include, but are not limited to, an electric, a magnetic, an optical, an electromagnetic, an infrared, or a semiconductor system, apparatus, or device or any combination of above.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

As used herein, the term "determine/determining" (and grammatical variants thereof) can include, not least: calculating, computing, processing, deriving, measuring, investigating, looking up (for example, looking up in a table, a database or another data structure), ascertaining and the like. Also, "determining" can include receiving (for example, receiving information), accessing (for example, accessing data in a memory), obtaining and the like. Also, "determine/determining" can include resolving, selecting, choosing, establishing, and the like.

While some embodiments have been described, these embodiments have been presented by way of example, and are not intended to limit the scope of the disclosure. Indeed, apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. At least one of these blocks may be implemented in a variety of different ways. The order of these blocks may also be changed. Any suitable combination of the elements and actions of some embodiments described above can be combined to provide further embodiments. Accompanying claims and their equivalents are intended to cover such forms or modifications as would fall within the scope and spirit of the disclosure.

ABBREVIATIONS USED IN THE
DESCRIPTION AND/OR IN THE FIGURES ARE
DEFINED AS FOLLOWS 5G fifth generation
BS base station
CBS credit-based shaper
CNC centralized network configuration
gNB next generation NodeB/5G base station
PDCCH physical downlink control channel
PDSCH physical downlink shared channel
RAN radio access network
TSC time sensitive communication
TSCAI TSC assistant information
TSN time sensitive network
UE user equipment

What is claimed is:
1. A terminal device comprising:
at least one processor; and
at least one memory comprising computer program code,
the at least one memory and the computer program code being configured to, with the at least one processor, cause the terminal device to perform:
receiving, from a network device, a first data packet; and
receiving, from the network device, at least one subsequent data packet according to at least one time delay,
wherein the at least one time delay is calculated for the at least one subsequent data packet based on parameters associated with a type of traffic shaper,
wherein the at least one delay is calculated in a case where the network device determines that one of the parameters associated with CBS classMeasurementInterval is larger than a threshold, wherein the at least one time delay comprises:

a first type of time delay calculated for the $i^{th}$ data packet by using a first equation: $Delay^1 = Time^1[i] - Time[i-1] = MaxFrameSize/operIdleSlope + delayOffset$, and receiving, from a network device, at least one subsequent data packet according to at least one time delay further comprises:

receiving, from the network device, the $i^{th}$ data packet at $Time^1[i]$ described by the first equation: $Time^1[i] = Time[i-1] + Delay^1$, i being an integer larger than 1, $Time^1[i]$ being the transmission time of the $i^{th}$ data packet and $Time[i-1]$ being the actual transmission time for the $(i-1)^{th}$ data packet, wherein $delayOffset = (maximum\ (EthernetFrameSize))/portTransmitRate$; and EthernetFrameSize is the number of bits per frame in Ethernet.

2. The terminal device of claim 1, wherein the type of traffic shaper is credit-based shaper (CBS), and the parameters associated with CBS further comprise: MaxFrameSize, operIdleSlope, and/or portTransmitRate.

3. The terminal device of claim 1, wherein the at least one time delay further comprises:

a second type of time delay calculated for the $i^{th}$ data packet by using a second equation: $Delay^2 = Time^2[i] - Time[i-1] = MaxFrameSize/operIdleSlope$; and/or a third type of time delay calculated for the $i^{th}$ data packetb by using a third equation: $Delay^3 = Time^3[i] - Time[i-1] = MaxFrameSize/operIdleSlope + delayOffset$, and receiving, from a network device, at least one subsequent data packet according to at least one time delay further comprises:

receiving, from the network device, the $i^{th}$ data packet at $Time^2[i]$ described by the second equation: $Time^2[i] = Time[i-1] + Delay^2$ or at $Time^3[i]$ described by the third equation: $Time^3[i] = Time[i-1] + Delay^3$, i being an integer larger than 1, $Time^2[i]$ or $Time^3[i]$ being candidate transmission time for the $i^{th}$ data packet and $Time[i-1]$ being the actual transmission time for the $(i-1)^{th}$ data packet.

4. The terminal device of claim 3, wherein the at least one memory and the computer program codes are configured to, with the at least one processor, cause the terminal device to perform:

receiving, from the network device, Delay.sup.2 and/or Delay.sup.3 calculated by the network before receiving the second data packet from the network device.

5. The terminal device of claim 1, wherein the at least one time delay further comprises:

a fourth type of time delay calculated for the $i^{th}$ data packet by using a fourth equation: $Delay^4[i] = Time^4[i] - Time[i-1] = Size[i-1]/operIdleSlope$; and/or a fifth type of time delay calculated for the $i^{th}$ data packetb by using a fifth equation: $Delay^5[i] = Time^5[i] - Time[i-1] = Size\ [i-1]/operIdleSlope + delayOffset$, and receiving, from a network device, at least one subsequent data packet according to at least one time delay further comprises:

receiving, from the network device, the $i^{th}$ data packet at $Time^4[i]$ described by the fourth equation: $Time^4[i] = Time[i-1] + Delay^4$ or at $Time^5[i]$ described by the fifth equation: $Time^5[i] = Time[i-1] + Delay^5$, i being an integer larger than 1, $Time^4[i]$ or $Time^5[i]$ being candidate transmission time for the $i^{th}$ data packet, $Time[i-1]$ being the actual transmission time for the $(i-1)^{th}$ data packet, and Size $[i-1]$ being the actual size of the $(i-1)^{th}$ data packet.

6. The terminal device of claim 5, wherein the at least one memory and the computer program code are further configured to, with the at least one processor, cause the network device to perform:

receiving, from the network device, Time.sup.4 [i] and Time.sup.5 [i] calculated by the network device before receiving the i.sup.th data packet from the network device.

7. The terminal device of claim 1, wherein the at least one memory and the computer program code are further configured to, with the at least one processor, cause the network device to perform:

receiving, from the network device, the parameters associated with CBS and at least one equation for calculating the at least one time delay for the at least one subsequent data packet; and synchronizing with the network device for receiving the at least one subsequent data packet, wherein the terminal device calculates the at least one time delay for the at least one subsequent data packet based on the parameters associated with CBS using the at least one time delay equation.

8. The terminal device of claim 1, wherein the at least one memory and the computer program codes are configured to, with the at least one processor, cause the terminal device to perform:

receiving, from the network device, Delay.sup.1 calculated by the network device before receiving the second data packet from the network device.

9. The terminal device of claim 8, wherein $Delay^1$, $Delay^2$ or $Delay^3$ is received through the scheduling signaling or MAC control element (MAC CE) or RRC signaling.

10. The terminal device of claim 1, wherein the at least one memory and the computer program code are further configured to, with the at least one processor, cause the network device to perform:

before receiving, from the network device, a subsequent data packet according to the at least one time delay, monitoring a physical downlink control channel (PDCCH) scheduling the reception of said subsequent data packet.

11. A method implemented at a terminal device comprising: receiving, from a network device, a first data packet; and receiving, from the network device, at least one subsequent data packet according to at least one time delay, wherein the at least one time delay is calculated for the at least one subsequent data packet based on parameters associated with a type of traffic shaper, wherein the at least one delay is calculated in a case where the network device determines that one of the parameters associated with CBS classMeasurementInterval is larger than a threshold, wherein the at least one time delay comprises:

a first type of time delay calculated for the $i^{th}$ data packet by using a first equation: $Delay^1 = Time^1[i] - Time[i-1] = MaxFrameSize/operIdleSlope + delayOffset$, and receiving, from a network device, at least one subsequent data packet according to at least one time delay further comprises:

receiving, from the network device, the $i^{th}$ data packet at $Time^1[i]$ described by the first equation: $Time[i] = Time[i-1] + Delay^1$, i being an integer larger than 1, $Time^1[i]$ being the transmission time of the $i^{th}$ data packet and $Time[i-1]$ being the actual transmission time for the $(i-1)^{th}$ data packet, wherein delayOffset=(maximum (EthernetFrameSize))/portTransmitRate; and EthernetFrameSize is the number of bits per frame in Ethernet.

12. The method of claim 11, wherein the type of traffic shaper is credit-based shaper (CBS), and the parameters associated with CBS further comprise: MaxFrameSize, operIdleSlope, and/or portTransmitRate.

13. The method of claim 11, wherein the at least one time delay comprises:

a second type of time delay calculated for the $i^{th}$ data packet by using a second equation: $Delay^2=Time^2[i]-Time[i-1]=MaxFrameSize/operIdleSlope$; and/or a third type of time delay calculated for the $i^{th}$ data packetb by using a third equation: $Delay^3=Time^3[i]-Time[i-1]=MaxFrameSize/operIdleSlope+delayOffset$, and receiving, from a network device, at least one subsequent data packet according to at least one time delay further comprises:

receiving, from the network device, the $i^{th}$ data packet at $Time^2[i]$ described by the second equation: $Time^2[i]=Time[i-1]+Delay^2$ or at $Time^3[i]$ described by the third equation: $Time^3[i]=Time[i-1]+Delay^3$, i being an integer larger than 1, $Time^2[i]$ or $Time^3[i]$ being candidate transmission time for the $i^{th}$ data packet and $Time[i-1]$ being the actual transmission time for the $(i-1)^{th}$ data packet.

14. The method of claim 11, wherein the at least one time delay comprises:

a fourth type of time delay calculated for the $i^{th}$ data packet by using a fourth equation: $Delay^4[i]=Time^4[i]-Time[i-1]=Size[i-1]/operIdleSlope$; and/or a fifth type of time delay calculated for the $i^{th}$ data packetb by using a fifth equation: $Delay^5[i]=Time^5[i]-Time[i-1]=Size[i-1]/operIdleSlope+delayOffset$, and receiving, from a network device, at least one subsequent data packet according to at least one time delay further comprises:

receiving, from the network device, the $i^{th}$ data packet at $Time^4[i]$ described by the fourth equation: $Time^4[i]=Time[i-1]+Delay^4$ or at $Time^5[i]$ described by the fifth equation: $Time^5[i]=Time[i-1]+Delay^5$, i being an integer larger than 1, $Time^4[i]$ or $Time^5[i]$ being candidate transmission time for the $i^{th}$ data packet, $Time[i-1]$ being the actual transmission time for the $(i-1)^{th}$ data packet, and $Size[i-1]$ being the actual size of the $(i-1)^{th}$ data packet.

15. The method of claim 11, further comprising:

before receiving, from the network device, a subsequent data packet according to the at least one time delay, monitoring a physical downlink control channel (PDCCH) scheduling the reception of said subsequent data packet.

* * * * *